US012624698B2

(12) United States Patent
Stubsgaard et al.

(10) Patent No.: US 12,624,698 B2
(45) Date of Patent: May 12, 2026

(54) CANNED ROTODYNAMIC FLOW MACHINE FOR A MOLTEN SALT NUCLEAR REACTOR AND AN ACTIVE MAGNETIC BEARING FOR USE IN A FLOW MACHINE FOR A MOLTEN SALT NUCLEAR REACTOR

(71) Applicant: Copenhagen Atomics A/S, Kastrup (DK)

(72) Inventors: Aslak Stubsgaard, Copenhagen (DK); Thomas Jam Pedersen, Copenhagen (DK); Thomas Steenberg, Copenhagen (DK)

(73) Assignee: Copenhagen Atomics A/S, Kastrup (DK)

( * ) Notice: Subject to any disclaimer, the term of this patent is extended or adjusted under 35 U.S.C. 154(b) by 175 days.

(21) Appl. No.: 18/632,628

(22) Filed: Apr. 11, 2024

(65) Prior Publication Data

US 2024/0275257 A1    Aug. 15, 2024

Related U.S. Application Data

(63) Continuation of application No. 18/016,862, filed as application No. PCT/DK2021/050251 on Jul. 29, 2021, now Pat. No. 11,990,815.

(30) Foreign Application Priority Data

Jul. 31, 2020    (DK) .............................. PA202070505
Jul. 31, 2020    (DK) .............................. PA202070506

(51) Int. Cl.
F04D 13/06          (2006.01)
H02K 3/12           (2006.01)
(Continued)

(52) U.S. Cl.
CPC ........... F04D 13/0606 (2013.01); H02K 3/12 (2013.01); H02K 5/128 (2013.01); H02K 7/09 (2013.01);
(Continued)

(58) Field of Classification Search
CPC ............ H02K 3/12; H02K 3/14; H02K 5/128; H02K 5/1285; H02K 7/09; H02K 44/02–06; F04D 13/0606
(Continued)

(56) References Cited

U.S. PATENT DOCUMENTS

| | | | |
|---|---|---|---|
| 4,504,098 A | 3/1985 | Battarel et al. | |
| 4,683,111 A * | 7/1987 | Helm ...................... | F16C 39/02 |
| | | | 376/394 |

(Continued)

FOREIGN PATENT DOCUMENTS

| | | |
|---|---|---|
| DE | 718359 | 3/1942 |
| DE | 10350171 | 6/2005 |

(Continued)

OTHER PUBLICATIONS

JP S6032545 A machine translation (Year: 1985).*

(Continued)

*Primary Examiner* — Oluseye Iwarere
*Assistant Examiner* — Minki Chang
(74) *Attorney, Agent, or Firm* — Crockett & Crockett, PC; K. David Crockett, Esq.

(57) ABSTRACT

A canned rotodynamic flow machine (1) configured for operating with a working fluid such as molten salt of a molten salt nuclear reactor. The stator windings are formed by one or more electrically conductive solid bars (12).

15 Claims, 14 Drawing Sheets

(51) Int. Cl.

| | |
|---|---|
| *H02K 5/128* | (2006.01) |
| *H02K 7/09* | (2006.01) |
| *H02K 7/14* | (2006.01) |
| *H02K 17/18* | (2006.01) |
| *H02K 44/06* | (2006.01) |

(52) U.S. Cl.
CPC .............. *H02K 7/14* (2013.01); *H02K 17/18* (2013.01); *H02K 44/06* (2013.01)

(58) Field of Classification Search
USPC ........................................................ 310/201
See application file for complete search history.

(56) References Cited

U.S. PATENT DOCUMENTS

| | | | |
|---|---|---|---|
| 5,129,795 A | | 7/1992 | Hyland |
| 5,927,941 A | | 7/1999 | Kato et al. |
| 10,630,127 B1 | | 4/2020 | Thomasson et al. |
| 2011/0116954 A1 | | 5/2011 | Hong et al. |
| 2015/0069680 A1 | | 3/2015 | Kuri |
| 2015/0263578 A1 | | 9/2015 | Hayslett et al. |
| 2016/0005497 A1 | | 1/2016 | Scott |
| 2016/0156241 A1 | | 6/2016 | Grübel et al. |
| 2017/0047804 A1 | | 2/2017 | Dajaku |
| 2017/0162283 A1* | | 6/2017 | Loewen ............... G21C 15/247 |
| 2018/0087532 A1 | | 3/2018 | Welschinger et al. |
| 2019/0363601 A1 | | 11/2019 | Kneidl et al. |
| 2020/0021158 A1 | | 1/2020 | Nakayama et al. |
| 2020/0028409 A1 | | 1/2020 | Jastrzebski |
| 2020/0044515 A1 | | 2/2020 | Dunn |
| 2020/0295613 A1 | | 9/2020 | Tomioka |
| 2021/0013759 A1 | | 1/2021 | Torrey |
| 2022/0143688 A1 | | 5/2022 | Bosworth |

FOREIGN PATENT DOCUMENTS

| | | | | |
|---|---|---|---|---|
| EP | 1227567 | | 7/2002 | |
| EP | 3079234 | | 7/2019 | |
| GB | 1124104 | | 8/1968 | |
| GB | 1124104 A | * | 8/1968 | ............. H02K 5/128 |
| GB | 2350488 | | 11/2000 | |
| JP | S6032545 | | 2/1985 | |
| JP | S6032545 A | * | 2/1985 | |
| JP | 4060214 | | 2/1992 | |
| JP | H04252895 | | 9/1992 | |
| JP | 10066288 | | 3/1998 | |
| JP | 11324970 | | 11/1999 | |
| JP | 2001133572 | | 5/2001 | |
| JP | 2016042090 | | 3/2016 | |
| JP | 2018506047 | | 3/2018 | |
| KR | 101284670 | | 7/2013 | |
| RU | 2606196 | | 10/2017 | |
| RU | 2644393 | | 12/2018 | |
| WO | WO2006024379 | | 9/2006 | |
| WO | WO2015083470 | | 6/2015 | |

OTHER PUBLICATIONS

International Search Report and Written Opinion dated Sep. 22, 2021 from International Patent Application PCT/DK2021/050251.

Examination Report No. 2 dated Jul. 19, 2024 from Australian Patent Application No. 2021317637.

Extended European Search Report dated Jul. 3, 2024 from European Patent Application No. 21848772.6.

Decision to Grant dated Sep. 12, 2024 from Japanese Patent Application No. 2023-504183.

Notice of Reasons for Refusal dated Jan. 26, 2024 from Japanese Patent Application No. 2023-504183.

Notice of Reasons for Refusal dated Jun. 11, 2024 from Japanese Patent Application No. 2023-504183.

Office Action dated Oct. 18, 2024 from Korean Patent Application No. 10-2023-7006452.

Office Action and Search Report dated Feb. 15, 2024 from United Arab Emirates Patent Application No. P6000191-2023.

Examination Report No. 1 dated Apr. 23, 2024 from Australian Patent Application No. 2021317637.

Office Action dated Nov. 12, 2024 from Canadian Patent Application No. 3189008.

Office Action dated Oct. 20, 2023 from Russian Application No. 2023101129.

Search Report dated Oct. 18, 2023 from Russian Application No. 2023101129.

"1st Process Report" and 1st Technical Examination dated Oct. 21, 2020 in DK Application PA202070505.

"3rd technical examination" dated Dec. 4, 2020 in DK Application PA202070505.

"3rd technical examination" dated Dec. 23, 2020 in DK Application PA202070505.

* cited by examiner

CANNED ROTODYNAMIC FLOW MACHINE FOR A MOLTEN SALT NUCLEAR REACTOR AND AN ACTIVE MAGNETIC BEARING FOR USE IN A FLOW MACHINE FOR A MOLTEN SALT NUCLEAR REACTOR

This application is a continuation of U.S. application Ser. No. 18/016,862, filed Jan. 18, 2023, pending, which is a national stage of International Application PCT/DK2021/050251, filed Jul. 29, 2021, which claims priority to Danish application PA202070505, filed Jul. 31, 2020 and Danish application PA202070506, filed Jul. 31, 2020.

TECHNICAL FIELD

The disclosure relates to a canned rotodynamic flow machine for operating with a working fluid such as molten salt, a cover gas, or other high temperature fluid of a molten salt nuclear reactor and to an active magnetic bearing for use flow machine for operating with a working fluid such as molten salt, a cover gas, or other high temperature fluid of a molten salt nuclear reactor.

BACKGROUND

A molten salt reactor (MSR) is a nuclear reactor where the nuclear reactor coolant and/or the nuclear fuel is a molten salt, typically a fluoride or chloride salt, with a melting point of around ~500° C., operating at a temperature of around ~600 to 700° C., and a boiling point of ~1000° C. above the melting point. One of the many advantages of this type of reactor is that molten salts can be used as the heat transfer media at very high temperatures while still operating at or close to atmospheric pressure. Heat can be extracted from such reactors by pumping the molten salt in a loop between the 'core' and a heat exchanger with the reactor power being directly proportional to the temperature drop across the heat exchanger and the flow rate. Thus, high throughput, long-lasting, low maintenance, and reliable pumps are desired capable of pumping 700° C. molten salt. Due to the corrosive nature of molten fluoride and chloride salt, their operation requires an inert containment atmosphere, furthermore molten salt or molten salt vapors cannot be allowed to escape to the environment, putting strict requirements on molten salt reactor pumps to be completely leak tight. This poses a severe technical challenge, since the temperature, the aggressive nature of the molten salt combined with high radiation levels renders only very few suitable materials to work with. For example, permanent magnets cannot be used for the electric motor driving the pump, since these types of magnets start to irreversibly lose their magnetism well before reaching the above-mentioned operating temperature. Another example is dynamic seals, which are often applied in pumps, and are not available for the temperature range and aggressive environment that a pump for a molten salt reactor is subjected to and are generally much less reliable than static seals or welded joints.

Molten salt reactors have been built and operated at Oak Ridge National Laboratory (ORNL) in the 1950s and 1960s with a research program lasting to the 1970s and other small programs around the world. ORNL investigated multiple pump designs, mainly 'cantilever pumps', where the pump and motor are connected by a long shaft to keep the motor at lower temperatures and radiation levels.

ORNL operated a molten salt reactor, called the 'Molten Salt Reactor Experiment' for several years and the pump in this design was a cantilever pump type pump with oil lubricated bearings. This pump had several issues, among them that the oil leaked into the fuel salt.

Other known molten salt pumps are used in concentrated solar power (CSP) systems also used molten salts as the heat transfer media, but the salts (nitrate salts) used are of a different kind than the ones used in commercial molten salt reactors (fluoride or chloride salts). Nitrate salts are less corrosive and unlike in a molten salt reactor fuel, the salt is not radioactive or hazardous. Thus, known nitrate salt pumps are cantilever pumps with a simple dynamic shaft seal. These are widely used and commercially available but have low requirement for leak tightness.

One of the challenges associated with molten salt reactor pumps is that stator windings are typically constructed with insulated wires and there are no suitable insulation materials for the stator winding wires that can handle the above mentioned operating temperatures and conditions when dealing for example with molten salt of a nuclear molten salt reactor.

Another challenge is that known electric motors and generators cannot operate at the high operating temperatures of molten salt reactors, thus, requiring the electric motor or generator unit and the connecting shaft to be cooled below the operating temperature of a medium of a typical molten salt reactor, which causes the salt vapor to deposit on cold surfaces within the dynamic seal, electric motor or generator, resulting in a shorter life-cycle of the equipment and increased risk of operating issues or release of radioactive material.

Another challenge is that known bearings do not operate satisfactorily at the high operating temperatures of molten salt reactors, thus, requiring the electric motor or generator unit and the connecting shaft to be cooled below the operating temperature of a medium of a typical molten salt reactor, which causes the salt vapor to deposit on cold surfaces within the dynamic seal, electric motor or generator, resulting in a shorter life-cycle of the equipment and increased risk of operating issues or release of radioactive material.

SUMMARY

It is an object to provide a flow machine that overcomes or at least reduces one or more of the problems described above.

The foregoing and other objects are achieved by the features of the independent claims. Further implementation forms are apparent from the dependent claims, the description, and the figures.

According to a first aspect, there is provided a canned rotodynamic flow machine configured for operating with a working fluid such as molten salt, a cover gas, or other high temperature fluid of a molten salt nuclear reactor, the canned rotodynamic flow machine comprising:

an impeller arranged in a volute,
    the volute having an inlet for the working fluid and an outlet for the working fluid,
    an induction or reluctance motor or generator comprising a stator and a rotor,
    a can, particularly a containment shell, separates a working fluid area, from a dry area containing the stator, with the rotor arranged in the working fluid area,
    the rotor being operably coupled to the impeller,
    the stator comprising stator windings for inducing a magnetic field that penetrates the rotor,
    the stator windings being distributed in slots arranged in the stator, the part of the stator windings inside the slots being formed by one or more electrically conductive solid bars, preferably solid copper bars, wherein each solid bar extends no more than once through a slot, and wherein the solid bars are positioned inside the slots by one or more spacers for electrically insulating the one or more electrically conductive solid bars from the stator.

By using electrically conductive solid bars for the stator windings, it becomes possible to electrically insulate the stator windings from their surrounding without the need for insulation material that needs to be pliable to avoid cracking during the production/assembly of the flow machine, and that needs to be able to withstand the high operating temperatures. Moreover, by utilizing solid bars for the stator windings it becomes possible to use lower voltage and higher currents to produce the operational torque needed/generate (motor-pump) the required energy (generator-fluidic motor). Solid bars allow a larger distance between the wires and stator for the same stator slot fill factor as normal winding wire, creating room around the wires for thicker electrical insulation and increasing the breakthrough voltage necessary for electrical shorting of the windings to each other or to the stator or stator can. The high radiation environment present in a molten salt reactor will ionize any fluid or solid present between the windings and or between the windings and stator and serve to lower the breakthrough voltage increasing the requirement for electrical insulation. Thus, solid bars make electrical insulation easier and provide a higher mechanical stability and render electrical arcing less likely, which results in a more stable, reliable operation of the apparatus. By using solid bars for the stator windings and suitable insulation it becomes possible to operate the motor/generator at the operating conditions of a molten salt reactor.

By using a canned rotodynamic flow machine, it becomes possible to eliminate the need for dynamic seals that either cannot be used at all or tend to have a relatively short service life and to vastly reduce the probability of leakage. Further, by using the canned rotodynamic flow machine with solid stator bars, the motor/generator can be cooled by the working fluid, thereby significantly simplifying the machine.

According to a possible implementation form of the first aspect, the flow machine comprises a rotodynamic pump driven by an induction or reluctance motor.

According to a possible implementation form of the first aspect, the flow machine comprises a rotodynamic hydraulic motor driving an induction or reluctance generator.

According to a possible implementation form of the first aspect, the stator windings inside a single slot are comprised of less than seventeen solid bars, preferably less than thirteen solid bars, even more preferably less than nine solid bars.

According to a possible implementation of the first aspect, the solid bars are least for their extent in the slot concerned a prismatic solid bar.

According to a possible implementation of the first aspect, the slots and solid bars extend in the stator along a straight line.

According to a possible implementation of the first aspect, each solid bar extends no more than once through a given slot.

By using thick, solid bars it becomes possible to overcome the problems associated with e.g. hairpin coils, as the bars do not need bending to position them within the stator core and they need not be pressed into the stator slots using e.g. force or expensive equipment.

Further, by using thick solid bars, that pass only once through a given slot, it is possible to assemble the stator coiling in the stator slots using spacers, preferably ceramic spacers, and to stack the stator bars into the slot concerned, and to thereafter electrically connect the stator bars to other stator bars or to the electric terminals.

According to a possible implementation of the first aspect, the ends of a solid bar are electrically connected at a position outside the slot concerned to another solid bar either in the same slot or in another slot, preferably by electrical connectors, or to an electric terminal.

By connecting the ends of the solid bars to e.g. another solid bar or electrical connectors or terminals it becomes possible to insert the solid bars one by one in their respective slots during assembly of the stator, whereupon the ends of the solid bars are electrically connected, thereby substantially facilitating the assembly process. According to a possible implementation of the first aspect, the solid bars are positioned inside the slots by one or more electrically insulating spacers, preferably ceramic spacers.

According to a possible implementation of the first aspect, the solid bars are positioned inside the slots by one or more spacers, the spacers preferably being electrically insulating or have low electric conductivity, the spacers preferably being ceramic spacers.

According to a possible implementation of the first aspect, the spacers are configured to space the solid bars from the walls of the slot and/or from other solid bars in the slot concerned.

By using electrically insulating spacers it becomes possible not only to hold the solid bars in place within the stator core, but it also ensures that the solid bars do not touch each other or the walls of the stator, hence inhibiting e.g. electrical shorting and/or arcing from occurring.

According to a possible implementation of the first aspect, the spacers are formed by refractory cement, the refractory cement preferably having been applied after positioning the solid bars in the slots.

According to a possible implementation of the first aspect, the spacers support the solid bars locally and wherein the spacers are provided at two or more axially spaced positions along the length of the solid bars in the slot concerned.

According to a possible implementation of the first aspect, the solid bars are positioned inside the slots by being embedded in an electrically insulating material, the insulating material preferably being refractory cement.

By insulating the individual bars to space them apart from each other and the wall of the stator core, the reliability and stability of the system increases greatly.

According to a possible implementation of the first aspect, each slot contains a single solid bar, the single solid bar preferably being embedded in an electrically insulating material that acts as a spacer.

According to a possible implementation of the first aspect, the solid bars have a polygon cross-sectional shape, preferably a rectangular cross-sectional shape, the corners of the polygon cross-sectional shape preferably being rounded.

According to a possible implementation of the first aspect, the solid bars have a circular or oval or rounded cross-sectional shape.

According to a possible implementation of the first aspect, the solid bars have a cross-sectional area of at least $16 \text{ mm}^2$, preferably at least $13 \text{ mm}^2$, more preferably at least $10 \text{ mm}^2$, even more preferably at least $7 \text{ mm}^2$, most preferably at least $5 \text{ mm}^2$.

According to a possible implementation of the first aspect, the solid bars are sufficiently rigid to maintain their shape under influence of electromagnetic forces generated when the motor or generator is operating, without coming in contact with the walls of the slot in which they are received, without coming in contact with the motor can wall of the stator, and without coming in contact with other solid bars, with the solid bars being supported in the slot by the spacers only.

By utilizing solid bars instead of e.g. bendable wires, it becomes possible to substantially maintain the original shape of the solid bar, thereby avoiding contact between the solid bar and the stator and/or the can despite electromagnetic, mechanical, and thermal stresses.

Furthermore, it becomes possible to substantially increase the conductor spacing compared to that of typical winding wire, while maintaining a high fill factor and good electrical efficiency, also making it possible to employ electrical insulating mechanical spacers between each individual conductor and between the conductors and stator.

The rotor is preferably contained in a containment shell to protect the rotor from the working fluid with the clearance being formed between the containment shell and the can.

According to a possible implementation of the first aspect, a clearance is formed between the rotor and the can, the canned rotodynamic flow machine preferably being configured for forcing a flow of working fluid through the clearance.

According to a possible implementation of the first aspect, the induction or reluctance motor or generator is configured to be cooled by the flow of working fluid in the clearance.

By allowing the working fluid to flow through the clearance, it becomes possible to simultaneously cool the canned rotodynamic flow machine as well as to lubricate the bearings. This allows the elimination of lubricants such as oil lubricants, necessary for other types of proposed and tested molten salt pumps, rendering the operation of the rotodynamic machine more stable and eliminates the need for oil lubrication, and thus removes the risk of oil leaking into the working fluid.

According to a possible implementation of the first aspect, the rotor has one or more axially thoroughgoing channels fluidically connected to the clearance for allowing a flow of working fluid through the one or more channels.

According to a possible implementation of the first aspect, the rotor is installed on a hollow shaft, the hollow shaft having a lumen, and wherein the lumen is fluidically connected to the clearance and allowing a flow of working fluid from the lumen to the inlet.

According to a possible implementation of the first aspect, the canned rotodynamic flow machine is configured to operate with a working fluid having a temperature above 500° C.

By having an operating temperature of above 500° C. for the canned rotodynamic flow machine, matching the temperature of the molten salt working fluid, salt from the working fluid will not deposit as there are no cold surfaces for deposition; this lengthens the life-cycle of the rotodynamic flow machine and allows for a more stable and reliable operation.

According to a possible implementation of the first aspect, the motor or generator is a hairpin motor or generator wherein each bar of the hairpins extends through only one of the slots. The solid bars can be considered to correspond to a half of a hairpin winding.

According to a possible implementation of the first aspect, the bars are insulated only by being spaced from other elements of the canned rotodynamic flow machine by the spacers or by the refractory cement and wherein the solid bars are preferably only in contact with the spacers and with electrical connectors or with the terminals.

According to a possible implementation of the first aspect, the width of the slot in the circumferential direction of the stator provides space for a single solid bar.

According to a possible implementation of the first aspect, the solid bars are not enveloped by insulation material.

According to a possible implementation of the first aspect, the solid bars in a slot are stacked radially.

According to a possible implementation of the first aspect, the canned rotodynamic flow machine is a canned rotodynamic pump or compressor and the induction or reluctance motor or generator is an induction or reluctance motor.

According to a possible implementation of the first aspect, the canned rotodynamic flow machine is a canned rotodynamic motor, and the induction or reluctance motor or generator is an induction or reluctance generator.

According to a possible implementation of the first aspect, the slots are radially distributed in the stator, preferably radially equally distributed in the stator.

According to a possible implementation of the first aspect, the longitudinal extent of the slots is arranged axially, preferably with the slots extending completely through the axial extent of the stator.

According to a possible implementation of the first aspect, the slots open radially to an inner circumferential surface of the stator.

According to a possible implementation of the first aspect, the rotor is at least partially enveloped in a shell that rotates in unison with the rotor and separates the material of the rotor from the working fluid.

By enveloping the rotor in a shell, it becomes possible to separate the rotor from the working fluid to increase the durability and reliability of the canned rotodynamic flow machine.

According to a possible implementation of the first aspect, the shell is at least partially formed by a thin-walled pipe, the thin-walled pipe preferably being made of stainless steel or a high nickel steel alloy such as e.g. Hastelloy-N.

By using stainless steel or nickel steel alloys it becomes possible to increase the corrosion resistance of the canned rotodynamic flow machine and it is cheap and readily available, thus reducing the cost of assembly and installation of the canned rotodynamic flow machine.

According to a possible implementation of the first aspect, the rotor comprises a stack of magnetically conductive plates with electrically conductive solid rotor bars radially distributed inside the rotor.

According to a possible implementation of the first aspect, the rotor comprises a stack of magnetically conductive plates with voids radially distributed inside the rotor.

According to a possible implementation of the first aspect, the solid bars have a longitudinal lumen for allowing a cooling medium to flow through the bars.

According to a possible implementation of the first aspect, the solid bars are formed by multiple longitudinally extending filaments or strips, preferably copper filaments or strips, bonded together, for example, the filaments or strips being bonded together by brazing with a low conductivity alloy or ceramic binder.

According to a possible implementation of the first aspect, the canned rotodynamic flow machine comprises one or more active magnetic bearings supporting the shaft.

According to a possible implementation of the first aspect, the active magnetic bearing comprises a stator and a rotor, the stator comprising stator windings for inducing a magnetic field that penetrates the rotor, the stator windings being distributed in one or more slots arranged in the stator, the part of the stator windings inside the one or more slots being formed by one or more electrically conductive solid bars, preferably solid copper bars.

According to a second aspect, there is provided an induction or reluctance motor or generator comprising a stator and a rotor, the stator comprising stator windings for inducing a magnetic field that penetrates the rotor, the stator windings being distributed in slots arranged in the stator, the part of the stator windings inside the slots being formed by one or more electrically conductive solid bars, preferably solid copper bars.

According to a third aspect, there is provided a molten salt loop of a molten salt nuclear reactor, the molten salt loop comprising a pump for pumping the molten salt, the pump comprising:

an impeller arranged in a volute, the volute having an inlet for the working fluid and an outlet for the working fluid, an induction or reluctance motor or generator comprising a stator and a rotor, a can, particularly a containment shell, separates a working fluid area, from a dry area containing the stator, with the rotor arranged in the working fluid area to form a canned pump, the rotor being operably coupled to the impeller, the stator comprising stator windings for inducing a magnetic field that penetrates the rotor, the stator windings being distributed in slots arranged in the stator, the part of the stator windings inside the slots is formed by one or more electrically conductive solid bars, preferably solid copper bars.

According to a fourth aspect, there is provided a use of a canned pump to pump molten salt having a temperature of 400° C. or more, preferably more than 500° C. and even more preferably more than 600° C., preferably in a molten salt loop more preferable in a molten salt loop of a molten salt nuclear reactor.

According to a fifth aspect, there is provided an active magnetic bearing configured to operate in an environment having a temperature above 400° C., preferably above 500° C. and more preferable above 600° C., the active magnetic bearing comprising:

a stator and a rotor, the stator comprising stator windings for inducing a magnetic field that penetrates the rotor, means for detecting the position of the rotor in communication with a controller configured for controlling a current supply to the stator windings, the stator windings being distributed in one or more slots arranged in the stator, the part of the stator windings inside the one or more slots being formed by one or more electrically conductive solid bars, preferably solid copper bars, the solid bars being positioned inside the slots by one or more spacers for electrically insulating the one or more electrically conductive solid bars from the stator.

By using electrically conductive solid bars for the stator windings, it becomes possible to electrically insulate the stator windings from their surrounding without the need for insulation material that needs to be pliable to avoid cracking during the production/assembly of the flow machine, and that needs to be able to withstand the high operating temperatures. Moreover, by utilizing solid bars for the stator windings it becomes possible to use lower voltage and higher currents to produce the operational torque needed/generate (motor-pump) the required energy (generator-fluidic motor). Solid bars allow a larger distance between the wires and stator for the same stator slot fill factor as normal winding wire, creating room around the wires for thicker electrical insulation and increasing the breakthrough voltage necessary for electrical shorting of the windings to each other or to the stator or stator can. The high radiation environment present in a molten salt reactor will ionize any fluid or solid present between the windings and or between the windings and stator and serve to lower the breakthrough voltage increasing the requirement for electrical insulation. Thus, solid bars make electrical insulation easier and provide a higher mechanical stability and render electrical arcing less likely, which results in a more stable, reliable operation of the apparatus. By using solid bars for the stator windings and suitable insulation it becomes possible to operate the motor/generator at the operating conditions of a molten salt reactor.

According to a possible implementation form of the fifth aspect, the stator windings inside a single slot are comprised of less than seventeen solid bars, preferably less than thirteen solid bars, even more preferably less than nine solid bars.

According to a possible implementation of the fifth aspect, the solid bars are least for their extent in the slot concerned a prismatic solid bar.

According to a possible implementation of the fifth aspect, the active magnetic bearing is a radial bearing and the slots and the solid bars extend in the stator along a straight line.

According to a possible implementation of the fifth aspect the active magnetic bearing is an axial bearing and the slots are circumferentially extending slots and the solid bars extend inside the circumferentially extending slots in the stator.

According to a possible implementation of the fifth aspect, each solid bar extends no more than once through a given slot.

By using thick, solid bars it becomes possible to overcome the problems associated with e.g. hairpin coils, as the bars do not need bending to position them within the stator core and they need not be pressed into the stator slots using e.g. force or expensive equipment.

Further, by using thick solid bars, that pass only once through a given slot, it is possible to assemble the stator coiling in the stator slots using spacers, preferably ceramic spacers, and to stack the stator bars into the slot concerned, and to thereafter electrically connect the stator bars to other stator bars or to the electric terminals.

According to a possible implementation of the fifth aspect, the ends of a solid bar are electrically connected at a position outside the slot concerned to another solid bar either in the same slot or in another slot, preferably by electrical connectors, or to an electric terminal.

By connecting the ends of the solid bars to e.g. another solid bar or electrical connectors or terminals it becomes possible to insert the solid bars one by one in their respective slots during assembly of the stator, whereupon the ends of the solid bars are electrically connected, thereby substantially facilitating the assembly process.

According to a possible implementation of the fifth aspect, the spacers are electrically insulating or have low electric conductivity, the spacers preferably being ceramic spacers.

According to a possible implementation of the fifth aspect, the spacers are configured to space the solid bars from walls of the slot and/or from other solid bars in the slot concerned.

By using electrically insulating spacers it becomes possible not only to hold the solid bars in place within the stator core, but it also ensures that the solid bars do not touch each other or the walls of the stator, hence inhibiting e.g. electrical shorting and/or arcing from occurring.

According to a possible implementation of the fifth aspect, the spacers are formed by refractory cement, the refractory cement preferably having been applied after positioning the solid bars in the slots.

According to a possible implementation of the fifth aspect, the spacers support the solid bars locally and wherein the spacers are provided at two or more axially spaced positions along the length of the solid bars in the slot concerned.

According to a possible implementation of the fifth aspect, the solid bars are positioned inside the slots by being embedded in an electrically insulating material, the insulating material preferably being refractory cement.

By insulating the individual bars to space them apart from each other and the wall of the stator core, the reliability and stability of the system increases greatly.

According to a possible implementation of the fifth aspect, each slot contains a single solid bar, the single solid bar preferably being embedded in an electrically insulating material that acts as a spacer.

According to a possible implementation of the fifth aspect, the solid bars have a polygon cross-sectional shape, preferably a rectangular cross-sectional shape, the corners of the polygon cross-sectional shape preferably being rounded.

According to a possible implementation of the fifth aspect, the solid bars have a circular or oval or rounded cross-sectional shape.

According to a possible implementation of the fifth aspect, the solid bars have a cross-sectional area of at least 16 mm$^2$, preferably at least 13 mm$^2$, more preferably at least 10 mm$^2$, even more preferably at least 7 mm$^2$, most preferably at least 5 mm$^2$.

According to a possible implementation of the fifth aspect, the solid bars are sufficiently rigid to maintain their shape under influence of electromagnetic forces generated when the motor or generator is operating, without coming in contact with the walls of the slot in which they are received, without coming in contact with the motor can wall of the stator, and without coming in contact with other solid bars, with the solid bars being supported in the slot by the spacers only.

By utilizing solid bars instead of e.g. bendable wires, it becomes possible to substantially maintain the original shape of the solid bar, thereby avoiding contact between the solid bar and the stator and/or the can despite electromagnetic, mechanical, and thermal stresses. Furthermore, it becomes possible to substantially increase the conductor spacing from that of typical winding wire, while maintaining high fill factor and good electrical efficiency, also making it possible to employ electrical insulating mechanical spacers between each individual conductor and between the conductors and stator.

According to a possible implementation of the fifth aspect the active magnetic bearing is a hairpin active magnetic bearing wherein each bar of the hairpins extends no more than once through a given slot.

The rotor is preferably contained in a containment shell to protect the rotor from a working fluid with a clearance being formed between the containment shell and a can that separates the stator from the working fluid.

According to a possible implementation of the fifth aspect, a clearance is formed between the rotor and the can.

According to a possible implementation of the fifth aspect, active magnetic bearing is configured to be cooled by the flow of working fluid in the clearance.

By allowing the working fluid to flow through the clearance, it becomes possible to simultaneously cool the active magnetic bearings. This allows the elimination of lubricants such as oil lubricants, necessary for other types of proposed and bearings, rendering the operation of the active magnetic bearing more stable and eliminates the need for oil lubrication and thus removes the chance of oil leaking into the working fluid.

According to a possible implementation of the fifth aspect, the rotor has one or more axially throughgoing channels fluidically connected to the clearance for allowing a flow of working fluid through the one or more channels.

According to a possible implementation of the fifth aspect, the rotor is installed on a hollow shaft, the hollow shaft having a lumen, and wherein the lumen is fluidically connected to the clearance and allowing a flow of working fluid from the lumen to the inlet.

According to a possible implementation of the fifth aspect, the active magnetic bearing is configured to operate with a working fluid having a temperature above 500° C.

By having an operating temperature of above 500° C. for the active magnetic bearing, matching the temperature of the molten salt working fluid, salt from the working fluid will not deposit as there are no cold surfaces for deposition; this lengthens the life-cycle of the elect magnetic bearing and allows for a more stable and reliable operation.

According to a possible implementation of the fifth aspect, the bars are insulated only by being spaced from other elements of the active magnetic bearing cement and wherein the solid bars are preferably only in contact with the spacers and with electrical connectors or with the terminals.

According to a possible implementation of the fifth aspect, the width of the slot in the circumferential direction of the stator provides space for a single solid bar.

According to a possible implementation of the fifth aspect, the solid bars are not enveloped by insulation material.

According to a possible implementation of the fifth aspect, the solid bars in a slot are stacked radially.

According to a possible implementation of the fifth aspect, the slots are radially distributed in the stator, preferably radially equally distributed in the stator.

According to a possible implementation of the fifth aspect, the longitudinal extent of the slots is arranged axially, preferably with the slots extending completely through the axial extent of the stator.

According to a possible implementation of the fifth aspect, the slots open radially to an inner circumferential surface of the stator.

According to a possible implementation of the fifth aspect, the rotor is at least partially enveloped in a shell that rotates in unison with the rotor and separates the material of the rotor from a working fluid.

By enveloping the rotor in a shell, it becomes possible to separate the rotor from the working fluid to increase the durability and reliability of the active magnetic bearing.

According to a possible implementation of the fifth aspect, the shell is at least partially formed by a thin-walled pipe, the thin-walled pipe preferably being made of stainless steel or a high nickel steel alloy such as e.g. Hastelloy-N.

By using stainless steel or nickel steel alloys it becomes possible to increase the corrosion resistance of the canned rotodynamic flow machine and it is cheap and readily available, thus reducing the cost of assembly and installation of the canned rotodynamic flow machine.

According to a possible implementation of the fifth aspect, the rotor comprises a stack of magnetically conductive plates.

According to a possible implementation of the fifth aspect, the solid stator bars have a longitudinal lumen for allowing a cooling medium to flow through the bars.

According to a possible implementation of the fifth aspect, the solid stator bars are formed by multiple longitudinally extending filaments or strips, preferably copper filaments or strips, bonded together, for example, the filaments or strips being bonded together by brazing with a low conductivity alloy or ceramic binder.

According to a possible implementation of the fifth aspect, the active magnetic bearing according to any of the possible implementations is configured for use in a canned flow machine, the active magnetic bearing comprising a can, particularly a containment shell, separating a working fluid area, from a dry area containing the stator, with the rotor arranged in the working fluid area, the rotor preferably being contained in a containment shell for protecting the rotor from the working fluid.

By using the active magnetic bearings in canned rotodynamic flow machine, it becomes possible to eliminate the need for dynamic seals that either cannot be used at all or tend to have a relatively short service life and to vastly reduce the probability of leakage. Further, by using the active magnetic bearings the rotodynamic flow machine can be used at high rpm, which is for example useful in the rotodynamic flow machine is used as a compressor for compressible working fluids.

According to a sixth aspect, there is provided a molten salt loop for a molten salt nuclear reactor, the molten salt loop comprising a pump for pumping the molten salt, the pump comprising:

an impeller on a shaft, preferably a hollow shaft with a lumen, the impeller being arranged in a volute, the volute having an inlet for the working fluid and an outlet for the working fluid, an induction or reluctance motor comprising a stator and a rotor on the shaft, a can, particularly a containment shell, separates a working fluid area, from a dry area containing the stator, with the rotor arranged in the working fluid area to form a canned pump, the rotor being operably coupled to the impeller by the shaft, the shaft being suspended by rotary and/or linear active electromagnetic bearings.

According to a seventh aspect, there is provided a use of a linear or rotary active electromagnetic bearing for suspending a shaft in a canned molten salt pump, preferably in a canned molten salt pump in a molten salt loop, more preferable in a canned molten salt pump in a molten salt loop of a molten salt nuclear reactor.

These and other aspects will be apparent from and the embodiments described below.

BRIEF DESCRIPTION OF THE DRAWINGS

In the following detailed portion of the present disclosure, the aspects, embodiments, and implementations will be explained in more detail with reference to the example embodiments shown in the drawings, in which:

FIG. 18b is an elevated view of a stator of an active axial magnetic bearing of the flow machine illustrated in FIG. 18a, FIG. 18c is an elevated view of solid stator bars of an active axial magnetic bearing of the flow machine illustrated in FIG. 18a, FIG. 18d is an elevated view of the flow machine illustrated in FIG. 18a, FIG. 19 is a side view of a stator core and stator windings bars of a magnetic bearing that can be used with the flow machine illustrated in FIG. 18a;

FIG. 21 is a perspective view of a possible configuration of the stator core and the stator winding bars and the electrical terminals of the magnetic bearing shown in FIG. 18a; and FIG. 22 is a top view of the stator core, stator winding bars, and the electrical connectors of the magnetic bearing shown in FIG. 18a.

DETAILED DESCRIPTION

An embodiment of a rotodynamic flow machine 1 is illustrated with reference to FIGS. 1 to 17. The rotodynamic flow machine 1 comprises a canned rotodynamic pump or compressor and an induction or reluctance motor. Alternatively, the canned rotodynamic flow machine comprises a canned rotodynamic motor and an induction or reluctance generator.

In the following description, the rotodynamic flow machine 1 is described with reference to an embodiment in which a rotodynamic pump is driven by an electric motor. However, it is understood that in another embodiment the machine can be configured with an electric generator driven by a fluidic motor. Thus, the rotodynamic pump may be driven by an induction or reluctance motor, or a rotodynamic fluidic motor may drive an induction or reluctance generator. In an embodiment, the motor-generator set up is reversible, so that the machine has an operation mode in which a fluidic motor drives a generator and another operation mode in which an electric motor drives a pump or compressor. In the following embodiment, the flow machine is described with reference to an electric motor driving a pump, but it is understood that the solutions and principles described also apply to the situation where the machine is a generator driven by a fluidic motor.

The rotodynamic pump 1 is configured for operation at elevated temperatures, for example above 400° C., preferably above 500° C., and more preferable above 600° C.

Figures 17, 18D:
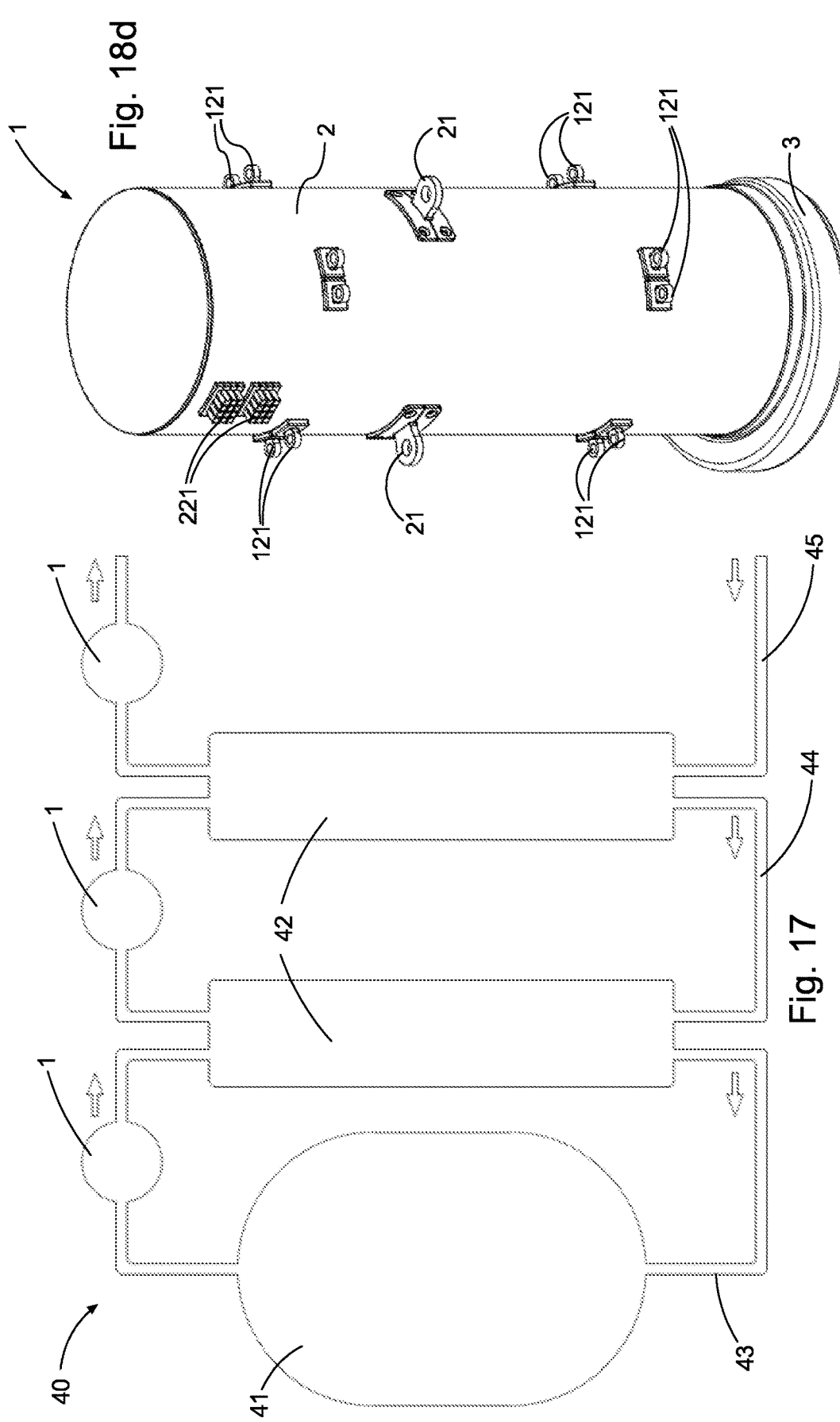
FIG. 17 is a diagrammatic representation of an embodiment of the flow machine in situ in a molten salt reactor.
Figure 18A:
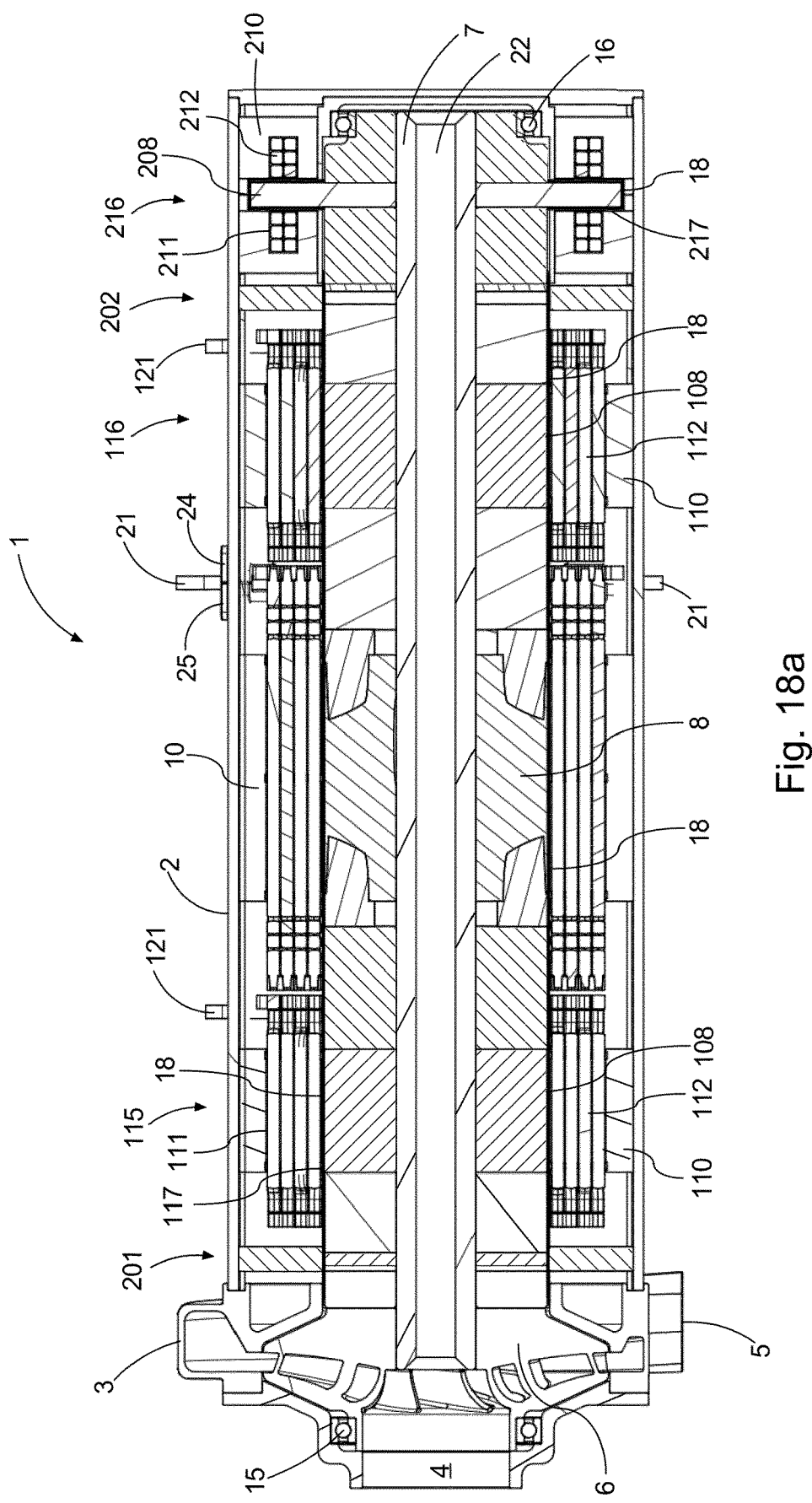
FIG. 18a is a sectional view of an embodiment of the flow machine with active magnetic bearings.
Figures 18B, 18C:
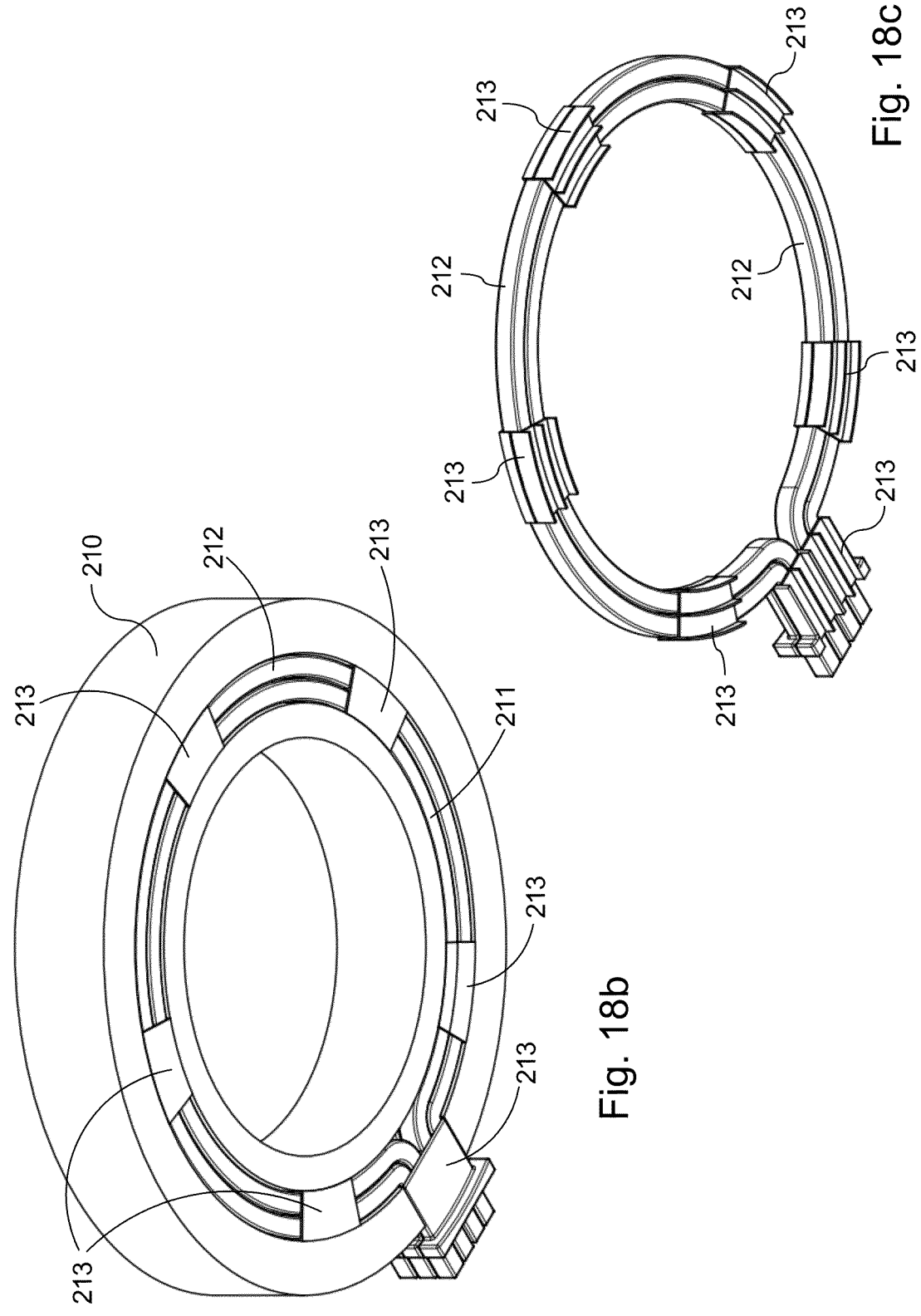
Figures 19, 20:
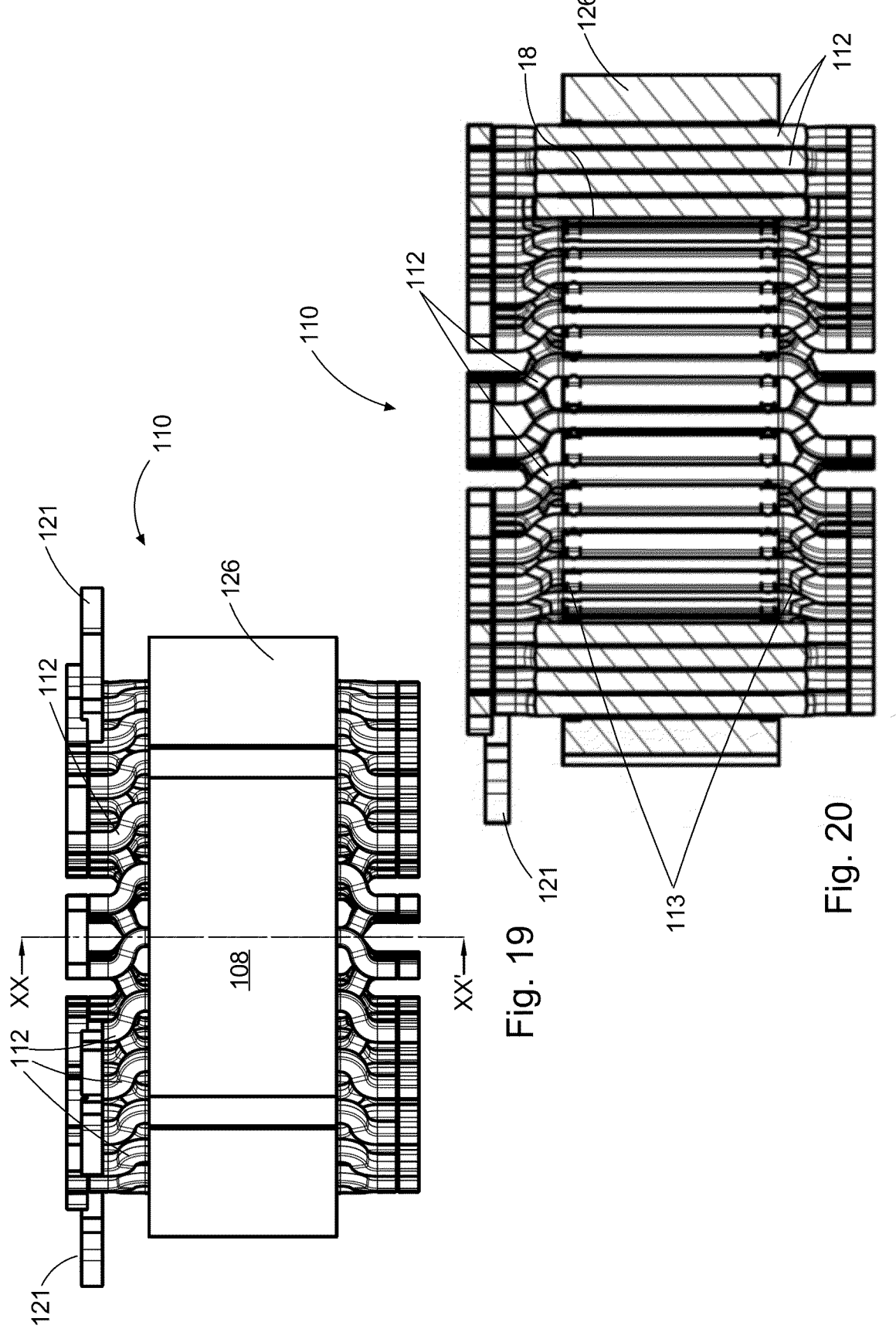
FIG. 20 is a cross-sectional side view along the line XX-XX' of the stator core and stator windings of the magnetic bearing shown in FIG. 19.
Figures 21, 22:
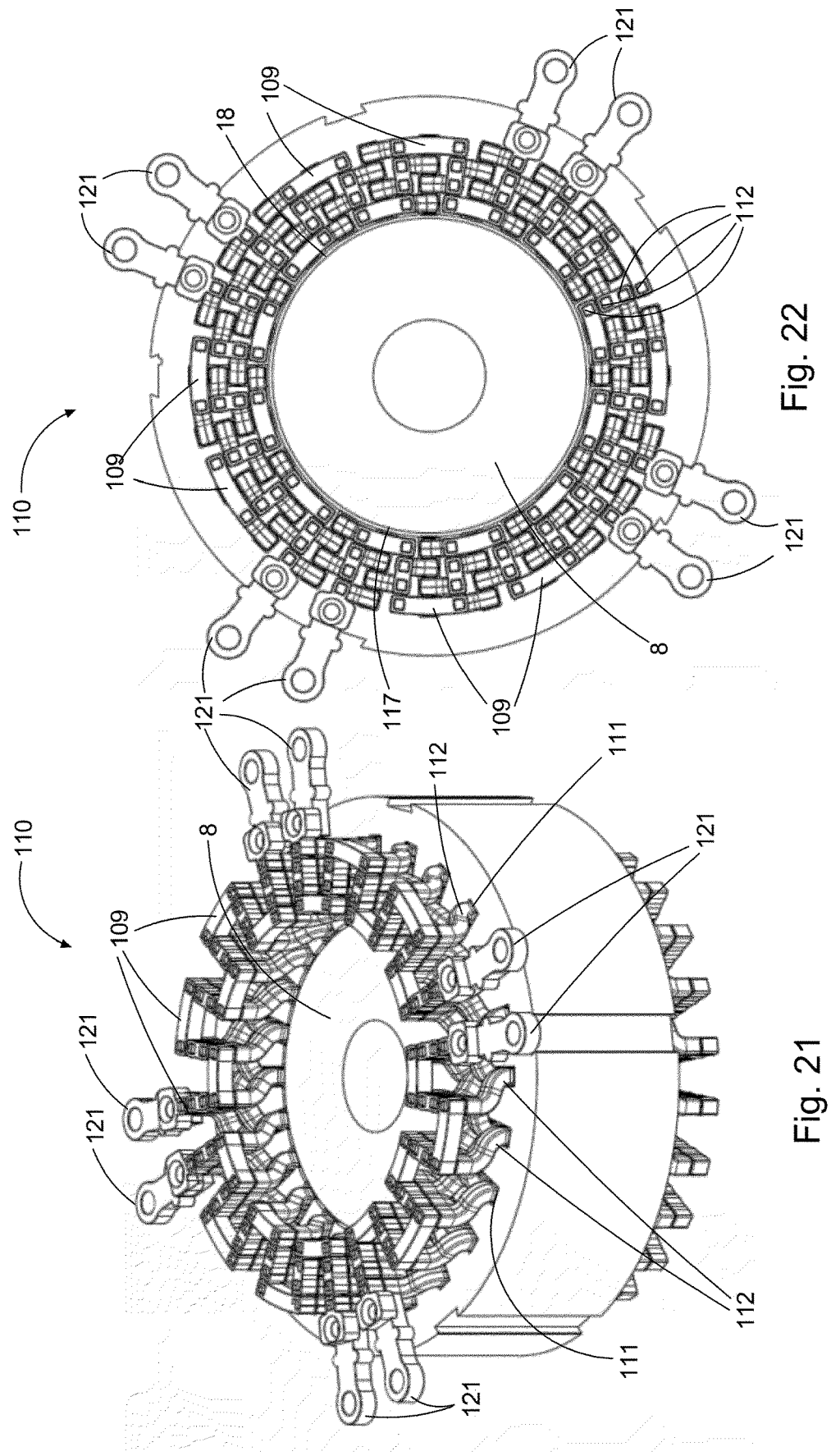

In a typical molten salt nuclear reactor 40 setting as shown in FIG. 17, there are multiple centrifugal flow machines 1. Each flow machine 1 is connected to a heat exchanger 42 and/or a coolant loop 44 or 45 for cooling the reactor core 41. The fuel salt loop 43 provides fuel salt for driving and controlling the nuclear reaction; further, the heat exchangers 42 provide the primary and secondary reactor coolants via the reactor coolant loop 44 and the secondary coolant loop 45. In order to circulate and drive the flow of molten salt, rotodynamic flow machines 1 are used.

In the present embodiment, the rotodynamic machine 1 is a rotodynamic pump 1 comprising a volute 3 with a fluid inlet 4 and a fluid outlet 5. An impeller 6 is arranged inside volute 3 and forms a together with the volute 3 a centrifugal pump for pumping molten salt of a nuclear reactor or other high-temperature liquid or a compressor for compressing a cover gas of a molten salt nuclear reactor or other hot gas. Further, the impeller 6 is connected to a shaft 7 and rotor 8 assembly and the rotor 8 is received in a stator 10.

Preferably, the impeller 6 is a "closed impeller" with a conical front and backside to aid with the stability of the impeller assembly, working as a 'journal bearing' lubricated by a molten salt film.

The rotodynamic pump 1 comprises a housing 2 for the electric induction or reluctance motor that drives the impeller 6 positioned within the volute 3 that is attached to the housing 2. The impeller 6 may be an open or closed impeller and may have a conical front and backside to aid with the stability of the rotor 8/impeller 6 assembly.

Electrical terminals 21 extend from the inner side of the housing 2 through the openings in the housing 2 to the outer side of the housing 2. The openings are provided with electrical insulators 24, 25, preferably ceramic insulators 24, 25, or other insulators 24, 25 that are suitable for operation in a high-temperature environment.

The shaft 7 connects the rotor 8/impeller 6 assembly. The shaft 7 is in an embodiment a hollow shaft with a lumen 22, allowing a flow of working fluid through the lumen 22 in the shaft 7. The shaft is rotatably suspended and both axially and radially supported from the housing 2/volute 6 by a first roller bearing 15 at the impeller side and by a second roller bearing 16 at the other side of the rotodynamic pump 1.

The rotor 8 is a canned rotor and is positioned within a thin-walled can 18, separating a working fluid area comprising the rotor 8 from the dry area comprising the stator 10. The rotor 8 is separated from the working fluid in case the working fluid is a molten salt as it may cause corrosion of the copper or iron elements of the rotor 8.

Hence, a clearance 20 is formed between the rotor 8 and the can 18 by enveloping the rotor with a thin-walled containment shell 17. The working fluid is allowed to flow through the clearance 20. The shell 17 rotates in unison with the rotor 8 and separates the material of the rotor 8 from the working fluid. The shell 17 is at least partially formed by a thin-walled pipe made of stainless steel or a high nickel steel alloy such as Hastelloy-N.

The clearance 20 is fluidically connected to the lumen 22 of the shaft 7, thereby allowing for a bypass flow of working fluid from the impeller 6 to the clearance 20 and from the clearance 20 through the lumen 22 back to the inlet 4 (the "eye" of the impeller 6). In an embodiment (not shown) the rotor is provided with channels for connecting the clearance 22 back to the inlet 4.

At the impeller side, the clearance 20 connects to the radially outward area in the volute 3, i.e. the high-pressure area. At the impeller side, the lumen 22 connects to the center of the volute 6 ("eye of the impeller"), i.e. the low-pressure area. The pressure difference forces a bypass flow of working fluid from the high-pressure area through clearance 20 and the lumen 22 to the low-pressure area. The resulting flow of working fluid through the clearance 20 and the lumen 22 absorbs heat (cools the induction or reluctance motor) and transports heat away from the induction or reluctance motor. Simultaneously, the working fluid lubricates the first- and second roller bearings 15, 16. Upon entering the lumen 22 of the shaft 7, the working fluid is forced towards the inlet 4 of the impeller 6 assembly. The connection between the clearance 20, the hollow shaft 7, and the inlet 4 of the impeller 6 allows for a continuous flow of the working fluid which results in an uninterrupted cooling of the induction or reluctance motor as well as the uninterrupted lubrication of the first- and second roller bearings 15, 16.

The impeller 6/rotor 8 assembly is supported by mechanical bearings 15 and 16, preferably by roller bearings or plain bearings at either end. The bearings 15 and 16 may be deep groove ball bearings that provide both axial and radial support, angular contact bearings, journal bearings, tilting-pad fluid bearings, or other types of conventional bearings. The bearings 15 and 16 may be made of e.g. stainless steel or other, corrosion-resistant steel or nickel alloys (e.g. nickel alloys e.g. Hastelloy-N) or carbide hard metal coated onto corrosion-resistance steel or nickel alloy or may be ceramic bearings (e.g. silicon carbide (SiC) or silicon nitride ($Si_3N_4$)).

Both the first- and second roller bearings 15,16 are serving as radial and axial (thrust) bearings. In another embodiment, shown in FIGS. 18a to 22 the rotodynamic flow machine 1 is provided with active magnetic bearings made of suitable materials for high temperature, which use electromagnetic suspension to provide axial and radial support to the shaft 7. In another embodiment (not shown) the first- and second roller bearings 15,16 are replaced with plain bearings, lubricated by the working fluid, are serving as radial and axial (thrust) bearings.

The electric motor driving the impeller 6 is an induction or reluctance motor comprising a stator 10 and a rotor 8. The rotor 8 is coupled to the impeller 6 by a shaft 7. In an embodiment, the electric motor is an asynchronous induction motor.

Figures 16A, 16B, 16C:
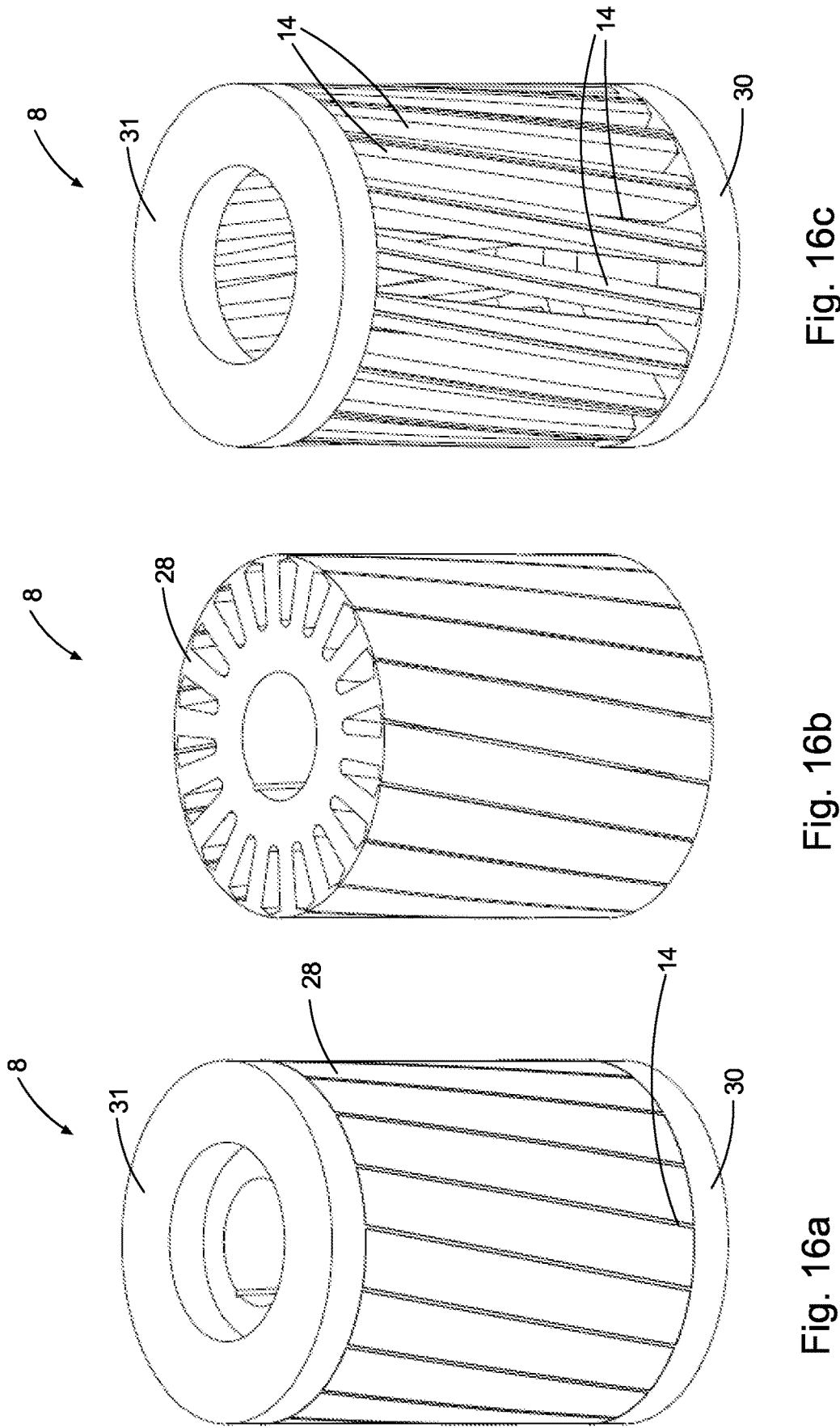
FIGS. 16a-16c are elevated views of the rotor part of the flow machine illustrated in FIG. 1.

The rotor 8 (as illustrated in FIG. 16*a*-16*c*) may be a squirrel cage rotor with laminate iron core 28 which is surrounded by a conductive copper squirrel cage 14 cast in place. The conductive copper rotor bars 14 may be slightly skewed and form the "squirrel cage" of the rotor 8. The end rings 30,31 of the rotor 8 may be made of solid disks/cylinders 30,31 of copper.

Neither iron nor copper is chemically compatible with molten fluoride and chloride salts, and since the molten salts are electrically conductive, iron and copper would also suffer galvanic corrosion and electrolysis due to the applied voltage. Hence, both the stator 10 and rotor 8 have been mechanically isolated from the salt medium. Stainless steel 316L has good corrosion resistance to salt, is inexpensive, and readily available, and hence the majority of the flow machine 1 is made from stainless steel 316L, including a thin-walled can 18 and a thin-walled shell 17 that separate the rotor 8 and stator 10 from the working medium, respectively.

The stator 10 comprises a hollow cylindrical stator core 26 with slots 11 formed within the inner part of the stator core 26. Preferably, the slots 11 are circumferentially equally distributed over the stator. In the present embodiment the slots 11 open to the radially inner side of the stator 10 and extend for the full axial length of the stator core 26.

The stator 10 is positioned in the dry area as the stator windings 12 must be mechanically isolated from the working fluid area as the stator windings 12 may suffer from galvanic corrosion and electrolysis due to the applied voltage in a molten salt e.g. molten fluoride or chloride salt environment.

The stator 10 comprises stator windings 12, made of solid stator bars 12, preferably of solid copper bars 12 which generate a magnetic field that penetrates the rotor 8 causing the rotor 8 to rotate. The solid stator bars 12 are preferably made of copper or a copper alloy since such materials are good electrical conductors and retain their electrical properties at operating temperatures of up to 800° C.

The solid stator bars 12 are in the present embodiment not enveloped in any form of electric insulation material (except for being at least partially enveloped in the spacers (13).

The stator windings 12 are distributed in slots 11 arranged in the stator 10 core. The solid bars 12 are positioned within the slots 11 and extend in the stator 10 along a straight line. By using thick solid bars 12 that pass only once through a given slot 11, electrical connections need to be made to other stator bars 12 (in the same or in another slot 11) or to electric terminals 21, allowing for easier transport and installation of the stator 10. The solid bars 12 are shown stacked radially in a slot 11, but it is understood that the solid bars 12 may also be circumferentially arranged side by side in a (wider) slot 11. Preferably the solid stator bars 12 are radially equally distributed in the slots 11.

Preferably, the solid stator bars 12 are radially stacked in a respective slot 11. In an embodiment (not shown) a wider slot 11 contains several radial stacks of stator bars 12.

The spacers 13 position, hold, and space the solid bars 12 in their designated places apart from each other within the respective slots 11, allowing the solid bars 12 to only be in physical contact with the spacers 13, the electrical connectors 9, and the terminals 21. The spacers 13 are either electrically insulating or have a high electric resistance.

The spacers 13 are in an embodiment made of non-electrically conducting ceramic material (e.g. aluminum oxide (alumina) or silicon carbide (SiC)). In an embodiment, the spacers 13 are made from Quartz based materials, such as glass. In an embodiment, the spacers 13 comprise braided quartz fiber material. Other suitable materials for the spacers 13 are semiconductors, such as Germanium, Silicon, Gallium Arsenide, Gallium Phosphide, and Cadmium Sulfide.

Figures 1, 2:
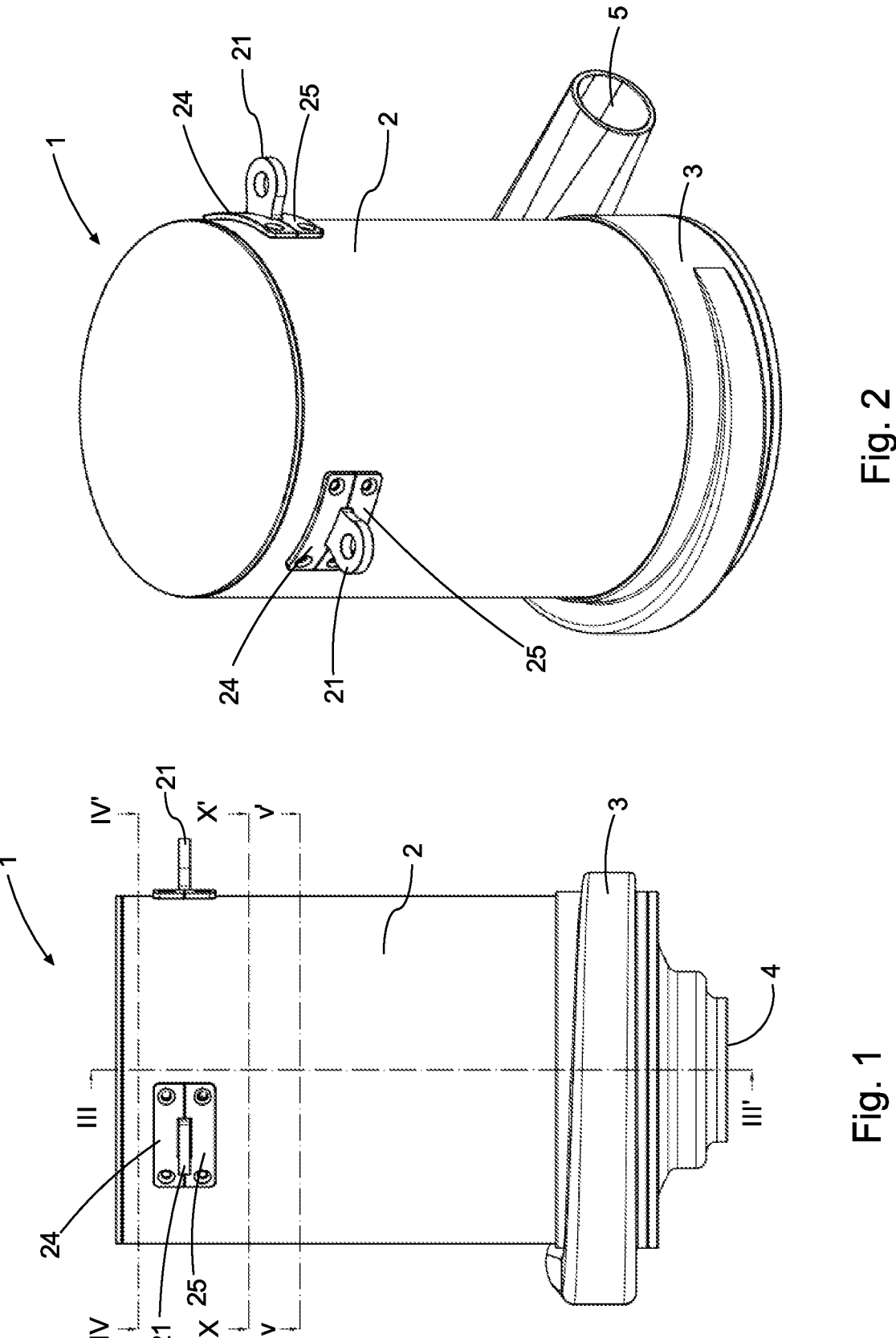
FIG. 1 is a diagrammatic representation of a flow machine in accordance with an embodiment.
FIG. 2 is an elevated view of the flow machine illustrated in FIG. 1.
Figures 3, 4:
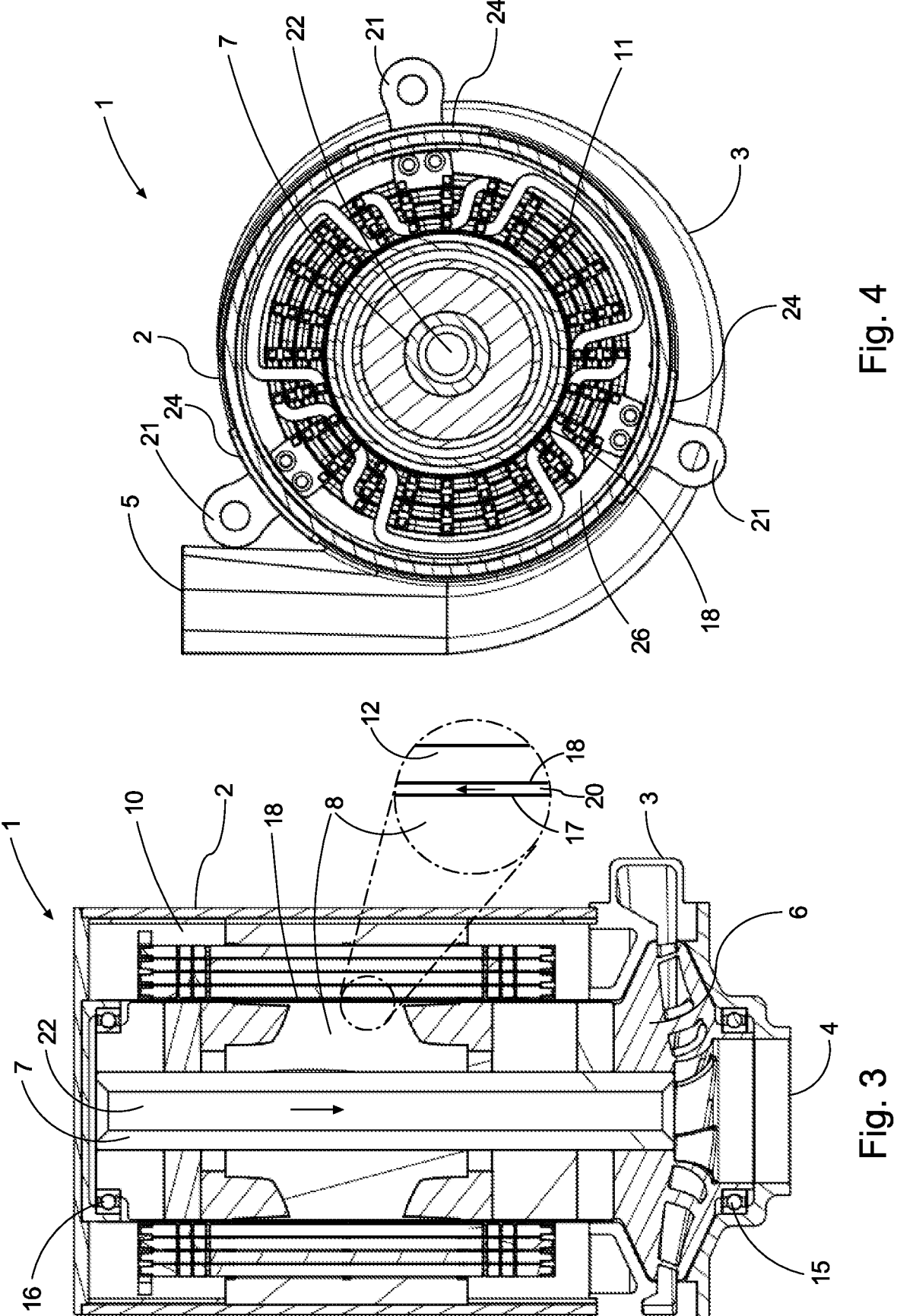
FIG. 3 is a sectional view of the flow machine illustrated in FIG. 1.
FIG. 4 is a cross-sectional of the flow machine illustrated in FIG. 1 according to the line IV-IV'.
Figures 5A, 5B, 6:
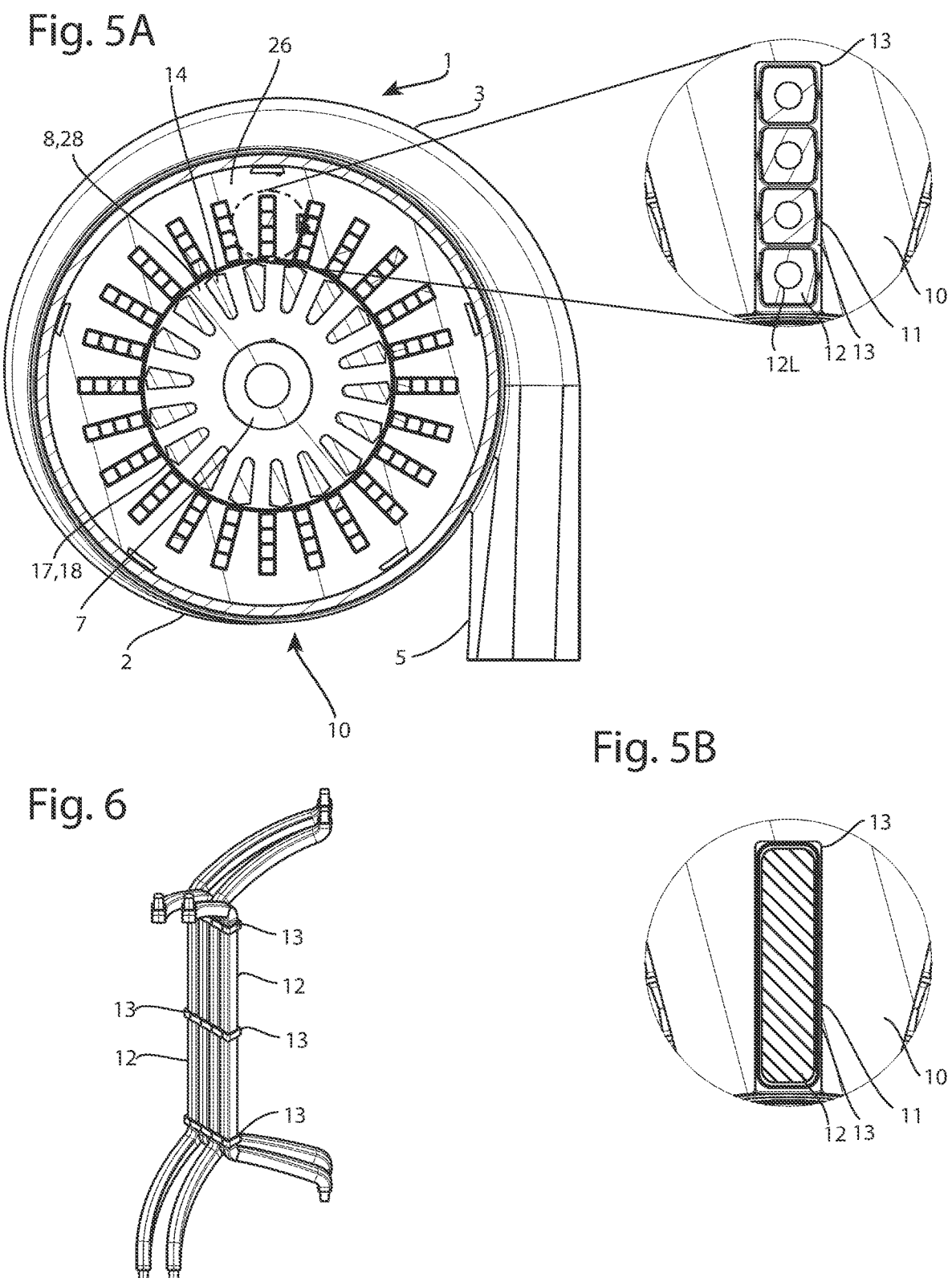
FIGS. 5A and 5B are cross-sectional views of the flow machine illustrated in FIG. 1 according to the line V-V', illustrating optional features of the solid bars.
FIG. 6 is an elevated view of a set stator winding bars of the flow machine illustrated in FIG. 1.
Figure 9:
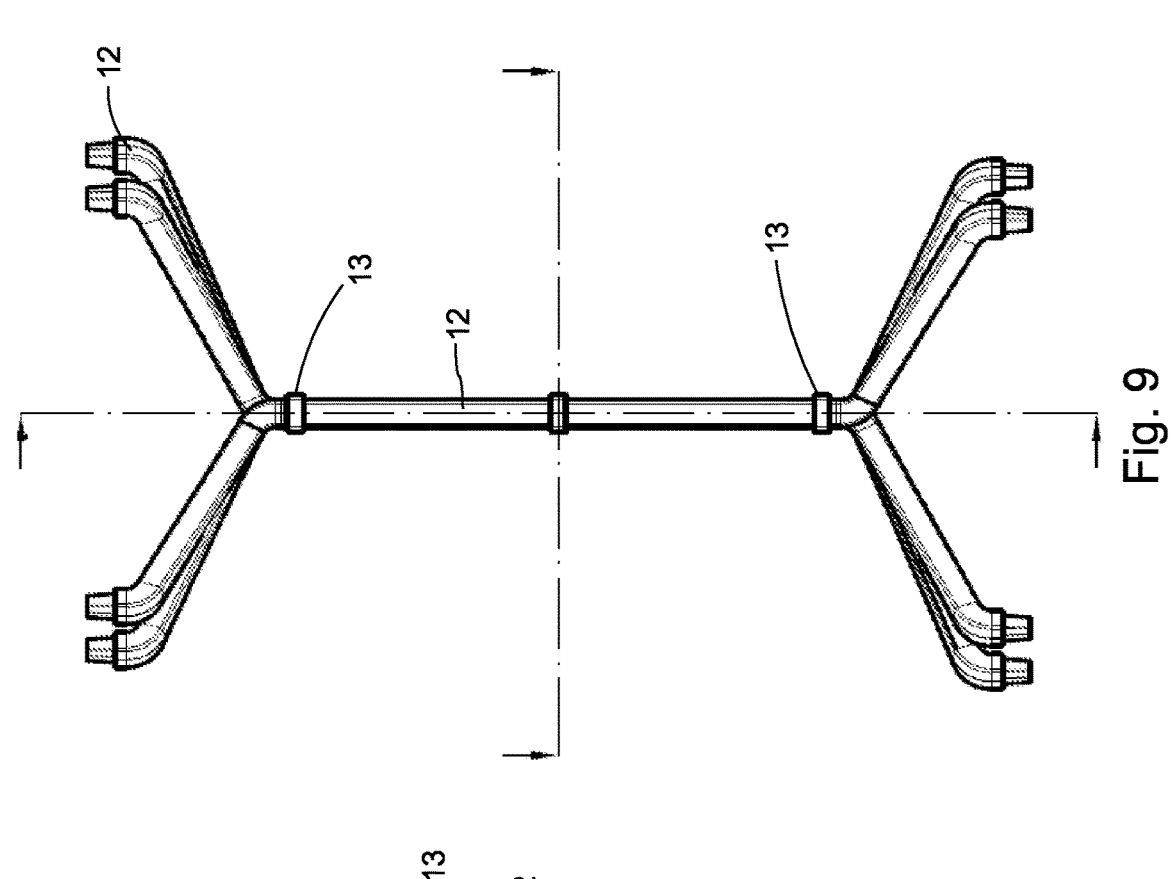
FIG. 9 is another side view of the set stator winding bars illustrated in FIG. 7.
Figure 8:
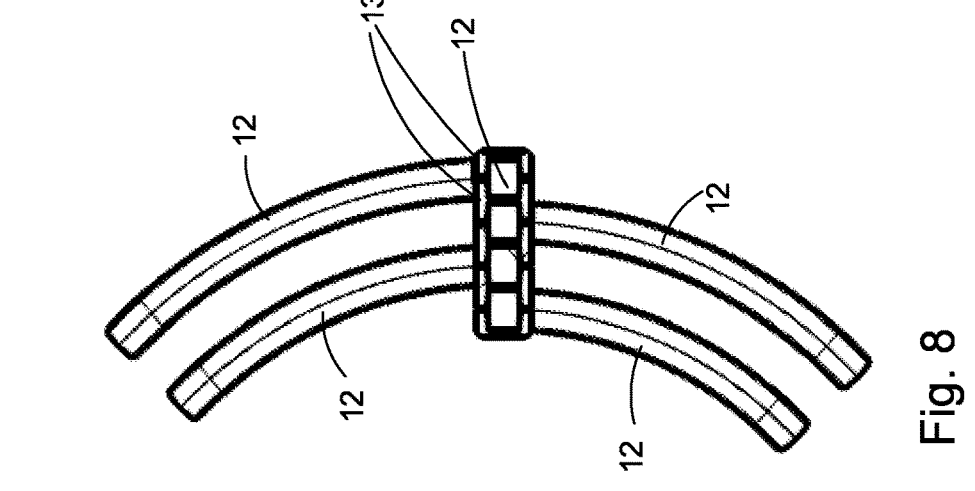
FIG. 8 is a top view of the set stator winding bars illustrated in FIG. 7.
Figure 7:
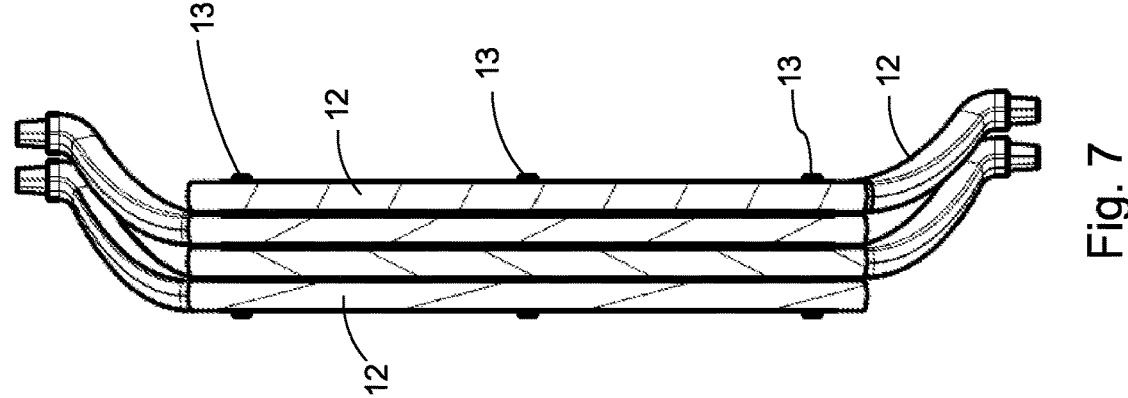
FIG. 7 is a side view of a set stator winding bars of the flow machine illustrated in FIG. 1.
Figures 10, 11:
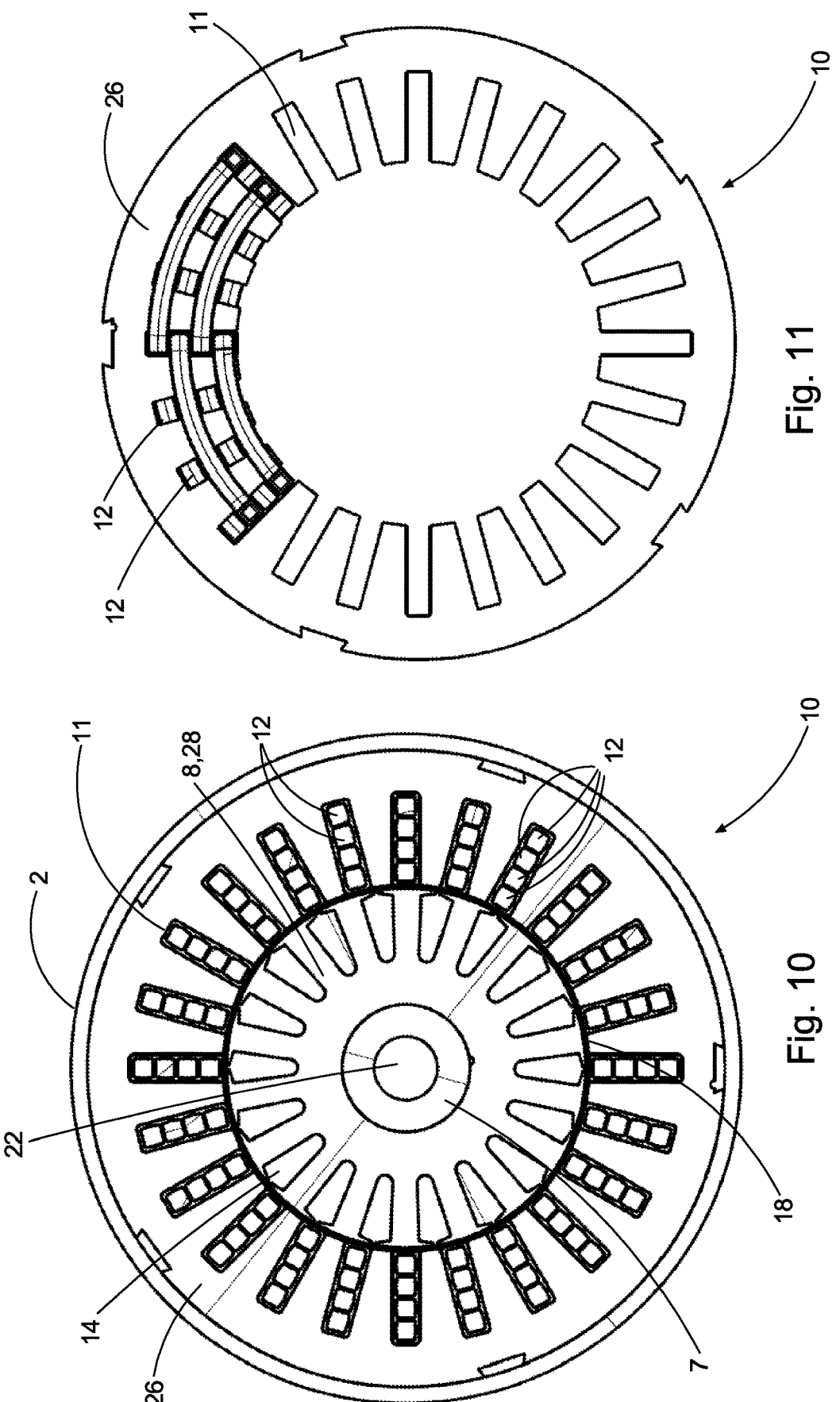
FIG. 10 is a cross-sectional view of flow machine illustrated in FIG. 1 along the line X-X'.
FIG. 11 is a top view of the stator core and the stator winding bars of the flow machine illustrated in FIG. 1.
Figure 12:
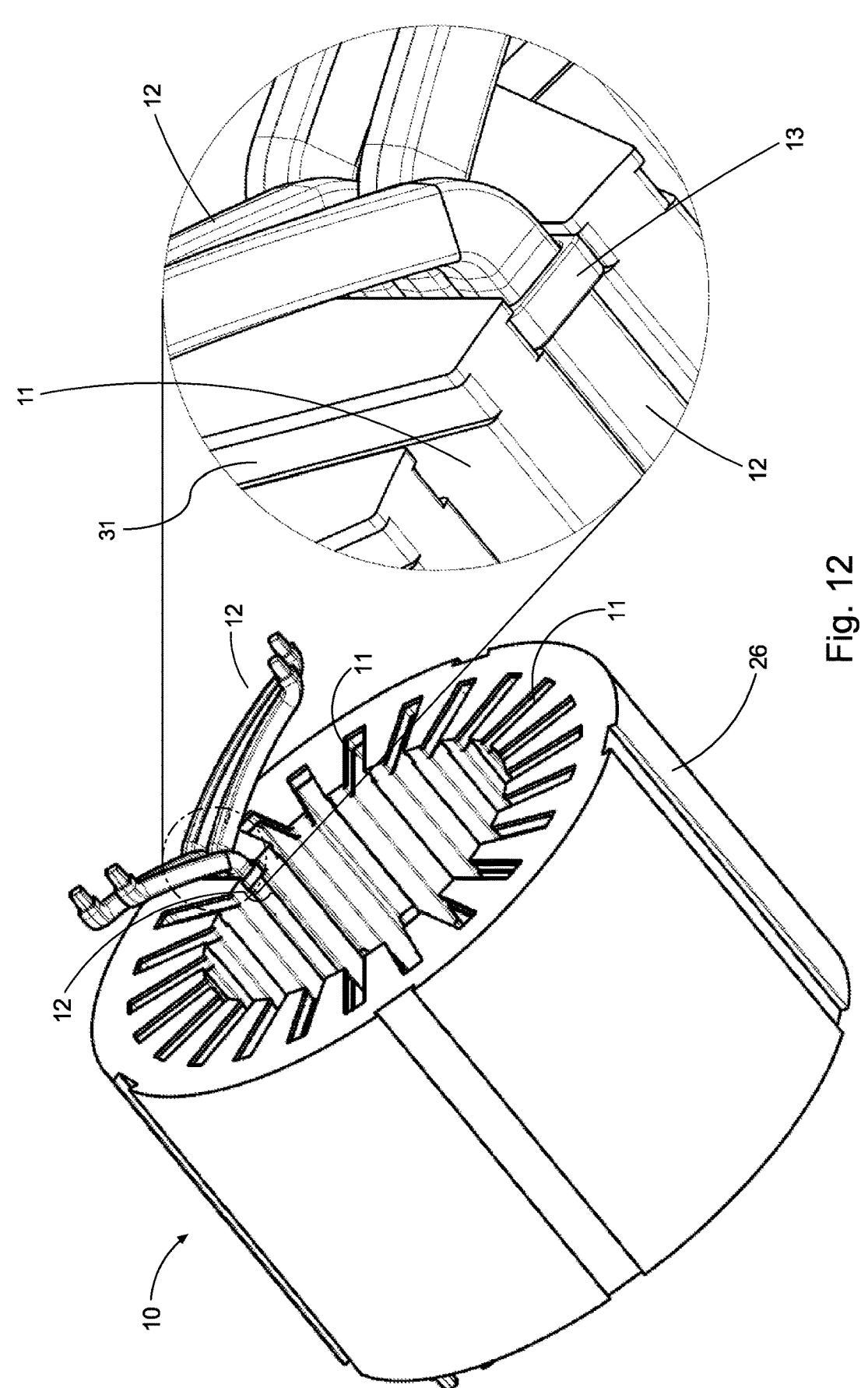
FIG. 12 is an elevated side view of the stator core and the arrangement of the stator winding bars in a stator slot of the flow machine illustrated in FIG. 1.
Figures 13, 14:
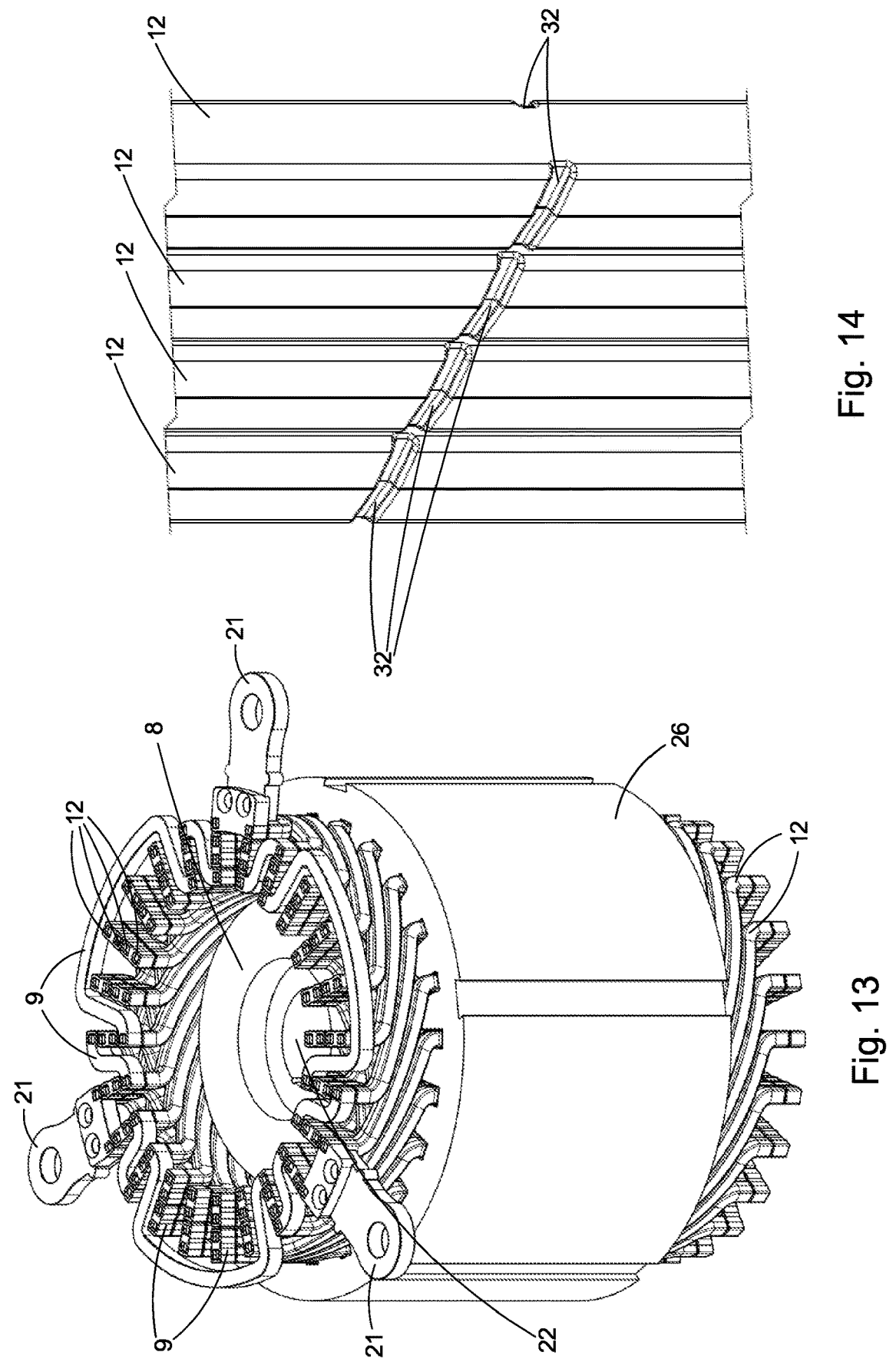
FIG. 13 is an elevated view of the stator and rotor of the flow machine illustrated in FIG. 1.
FIG. 14 is a detailed side view of the stator bars of the flow machine illustrated in FIG. 1.
Figures 15A, 15B, 15C, 15D:
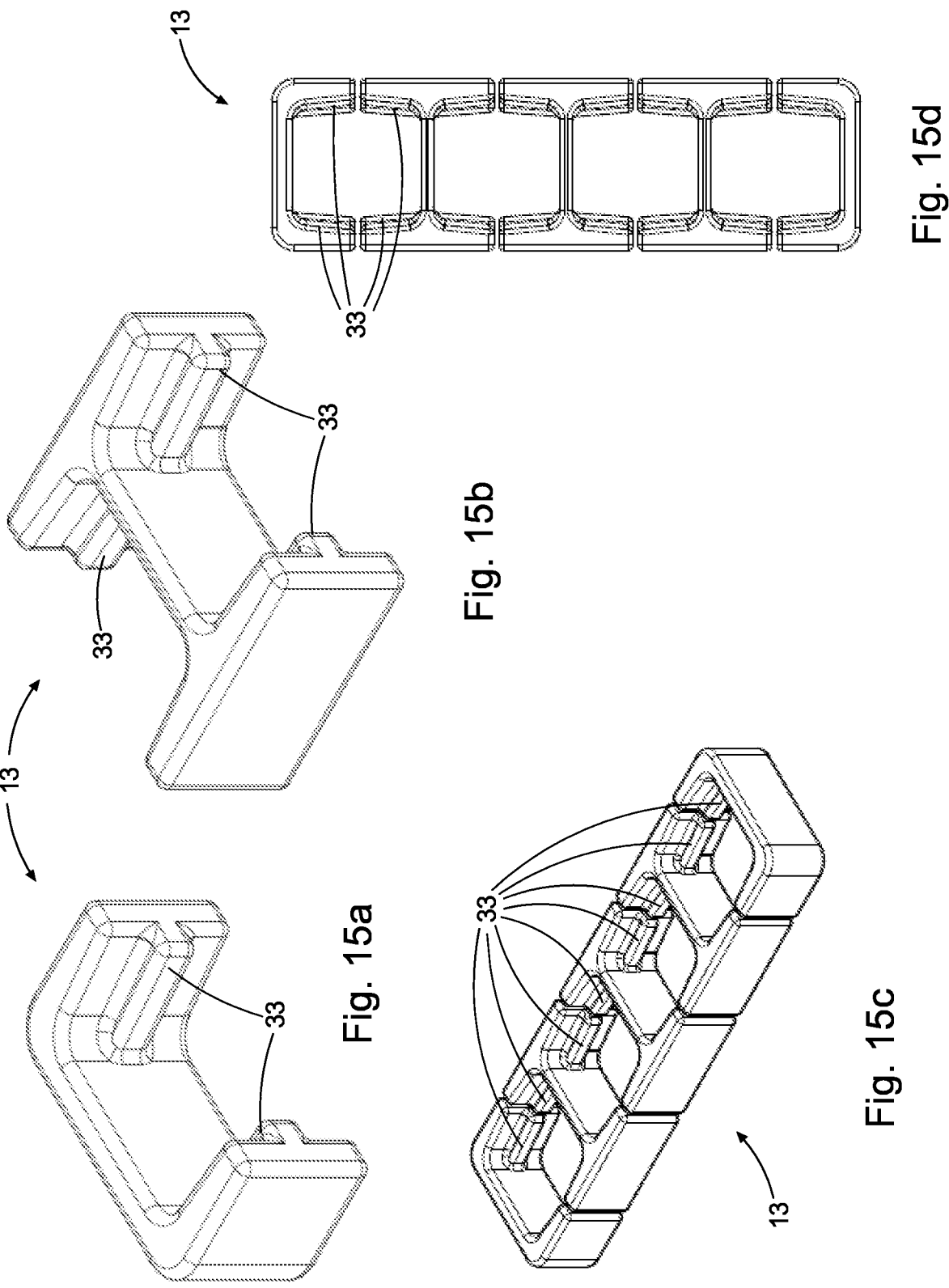
FIGS. 15a-15d are elevated views and a top view, respectively, of the possible configurations of the spacers shown in FIGS. 6-9 and FIG. 12.

The spacers 13 allow the stator bars 12 to be stacked into the slot 11 concerned. The spacers 13 may also be formed from refractory cement, which may be applied before or after positioning the solid bars 12 in the slots 11. There may be two or more spacers 13 in two or more axially spaced positions along the length of the solid bars 12 in the slot 11 concerned, e.g. FIG. 6 shows the use of five spacers at each axially spaced position along the length of the solid bar 12. Preferably, the spacers 13 do not completely envelop the solid bars 12.

The spacers 13 are formed like U-shaped or H-shaped clips as illustrated in FIGS. 15*a*-15*d*. The U-shaped spacers 13 are used in the "top" and "bottom" (radially outer and inner boundaries of the slot 11, respectively) of the slot 11 and space the solid bar 12 concerned from the bottom and top of the slot 11 concerned (the "top" of the slots is formed by the can 18) and the sidewalls of the slot and the H-shaped spacers are used between solid bars 12 and space the solid bars 12 from one another and from the sidewalls of the slot 11 concerned.

As best seen in FIG. 6 the spacers 13 are provided at axially spaced positions, where they provide local support for the solid bars 12 concerned. Due to the fact that the solid bars 12 are relatively stiff, there will be no physical contact between neighboring solid bars 12 and no contact between solid bars 12 and the walls that define the slot 11 concerned, even when force is applied to the solid bars 12 by the magnetic field of the induction or reluctance motor.

As illustrated in FIG. 14 and FIGS. 15*a*-15*d*, the solid bars 12 have transverse grooves 32 at two or more axially spaced positions, that are configured to receive protrusions (ridges) 33 arranged on the inner side of the U- or H-shaped spacers 13. This not only assists the construction of the stator bars 12 in the slots 11, but also prevents the spacers 13 from moving axially along the length of the solid bars 12. The spacers 13 consequently have inner ridges 33 formed on opposing ends along their inner surface which are received in the grooves 32 of the solid bars 12. Preferably, and the height of the ridges 33 corresponds to the depth of the grooves 32.

Alternatively, the solid bars 12 may be embedded in an electrically insulating material e.g. refractory cement.

The stator bars 12 are preferably made from copper or other highly conductive materials with suitably high melting points and strength required for use in molten salt reactors or other, high temperature applications, such as W or Cu—Ni alloys. The electrical connections to the solid bars 12 are in an embodiment brazed, e.g. brazed with Cu—Ag eutectic metal brazing compounds which have lower melting points then Cu, but Ag does not introduce impurities that affect the conductivity of the stator bars 12, unlike most other metals that may be used for brazing.

In the shown embodiment the solid bars 12 have a substantially square cross-sectional shape, with rounded edges. However, it is understood that the solid bars 12 could have other suitable cross-sectional shapes, such as a polygon cross-sectional shape, a rectangular cross-sectional shape, or a circular or oval or rounded cross-sectional shape. The rectangular cross-section allows for a high ratio of the cross-sectional area of the solid bars 12 in the stator 10, thereby increasing the conductivity of the stator windings, increasing fill factor, and improving motor power and efficiency.

The solid bars 12 may be, at least for their extent in the slot 11 concerned, a prismatic solid bar 12, i.e. the cross-sectional shape of the bar is the same all along its length. Preferably, each solid bar 12 extends no more than once through a given slot 11.

Each slot 11 has one or more solid bars 12 positioned within. Preferably, there are less than seventeen solid bars 12, more preferably less than thirteen solid bars 12 or even more preferably there are less than 9 solid bars in a single slot 11. The longitudinal extent of the slots 11 may extend completely through the full axial extent of the stator core 26, as partially shown e.g. in FIG. 11 and FIG. 12. The slots 11 radially open to the inner circumferential surface of the stator core 26, hence allowing the bars 12 to be stacked in the inner part of the stator core 26.

The cross-sectional area of the solid bars 12 is in an embodiment at least 16 mm$^2$, preferably at least 13 mm$^2$, more preferably at least 10 mm$^2$, even more preferably at least 7 mm$^2$, most preferably at least 5 mm$^2$.

A certain cross-sectional area and shape are required for providing sufficient rigidity for the solid bars 12, such that the solid bars 12 do not touch each other or touch the walls of the slots in which they received, even when they bend on the influence of the magnetic fields generated during operation of the induction or reluctance motor. By using solid bars 12 instead of e.g. wires for the stator windings, the solid bars 12 have sufficient rigidity to maintain their shape sufficiently under the influence of the magnetic forces generated when the motor or generator is operated to ensure that there is no contact between neighboring solid bars 12 and between solid bars 12 and the slot 11 in which they are received, even though the solid bars 12 are supported only locally and axially distanced by spacers 13. The solid bars 12 are only supported in the slot 11 by the spacers 13. In the shown embodiment, the slots 11 in the circumferential direction have a width for providing space for a single solid bar 12, but it is understood that a configuration with 2 or more solid bars 12 side by side in a wider slot 11 is also feasible.

Preferably the solid stator bars 12 are substantially prismatic over the full length of the solid stator bars 12 in a slot 11 and protrude from both axial ends of the slot 11. Small grooves 32 may be formed along the length of the solid stator bars 12 in a slot 11, these grooves 32 allowing spacers 13 to be secured to the solid stator bars 12 and prevent the spacers 13 to be axially displaced. In an embodiment, the slots 11 are provided with corresponding grooves 31 that allow the spacers to be secured in the axial direction relative to the slot 11 thus, the combination of the grooves 32 in the stator bars 12 and the grooves 31 in the slots 11 axially secure the position of the stator bars 12 relative to the stator 10.

Preferably, a single stator bar 12 extends only once through a given slot 11. The ends of the stator bars 12 that protrude from the stator 10 can either be straight or bent, according to need, and are electrically connected to either another solid stator bar 12 in the same slot 11, or to another solid stator bar 12 in another slot 11 or one of the electric terminals 21.

The stator bars 12 are electrically connected to one another by electrical connectors 9 or to the electric terminal(s) 21. The stator bars 12 may be welded, brazed, or soldered to electric connectors or to an electrical terminal 21 or may be connected by using any other suitable means for electrically connecting the bars 12 either to one another or to an electric terminal 21.

Preferably, the electrical connectors 9 are connected to the ends of the solid stator bars 12, i.e. after assembly.

The induction or reluctance motor includes a rotor 8 rotatably positioned inside of the stator 10. Here, the stator 10 may be formed in such a manner that multiple steel plates are laminated in a cylindrical form corresponding to the shape of the motor. The stator 10 includes a stator core 26 with slots 11 extending in the axial direction of the stator 11. Stator windings formed by the solid stator bars 12 that extend axially through the slots 11.

In addition, the rotor 8 may be formed in such a manner that multiple steel plates are laminated in a cylindrical form to correspond to the stator 10 and may be inserted into the hollow of the stator 10. The rotor 8 may include a rotor core with a plurality of electrically conductive rotor bars 14 that form the rotor windings. The rotor bars 14 are distributed circumferentially, preferably evenly distributed circumferentially and extend substantially axially in the rotor 8. Thus, the rotor 8 comprises in an embodiment a stack of magnetically conductive plates with electrically conductive solid rotor bars 14 radially distributed inside the rotor. According to an embodiment, the rotor 8 comprises a stack of magnetically conductive plates with voids radially distributed inside the rotor 8.

FIGS. 18a, 18b, 18c, and 18d to 22 illustrate another embodiment of the rotodynamic flow machine 1, but with active magnetic bearings (AMBs) used to rotatably support the shaft 7. In this embodiment, structures and features that are the same or similar to corresponding structures and features previously described or shown herein are denoted by the same reference numeral as previously used for simplicity.

Three AMBs are provided in the present embodiment of the rotodynamic flow machine 1: a lower radial AMB 115, an upper radial AMB 116, and an axial AMB 216. The lower radial AMB 115 and the upper radial AMB 116 are radial load-bearing and each comprise a stator 110 and a rotor 108. The stator 110 comprises stator bars 112 and the stator fits around the rotor 108 with a clearance 20 that allows for the passage of the working fluid. The stator 110 is secured to the housing 2 and the rotor 108 is installed on the shaft 7. The AMBs 115,116, are configured to keep the shaft 7 of rotor 8 centered, with the stator solid bars 112, conducting the current for generating the required magnetic force. The axial load bearing AMB 216 comprises a disk-shaped rotor 208 with a stator 210 being arranged on each side of the disc-shaped rotor 208, with each side of the stator 210 provided with circumferentially extending solid stator bars 212. The stator bars 212 extend substantially circumferentially in corresponding slots 211 in the stator 210, separated from one another and from the slot 211 by spacers 213. The ends of all of the stator bars 212 extend radially from the stator 210 through a corresponding portion of the slot 211 in the stator 210 to form terminals 221. The radially extending ends of the stator bars 212 are spaced by a spacer 213.

The clearance 20 between the stator 210 and the rotor 208 allows for the passage of the working fluid. The AMB 216 is configured to keep the shaft 7 axially in place. The shaft 7 is rotatably suspended and both axially and radially supported from the housing 2/volute 3 by the lower radial AMB coil 115, the upper radial AMB coil 116, and the axial AMB coil 216, magnetically acting on the rotors 108 and 208, respectively.

A lower radial position sensor 201 is positioned between the lower radial AMB 115 and the impeller 6, and an upper axial position sensor 202 is positioned between the upper radial AMB 116 and the axial AMB 216. The lower and upper radial position sensors 201, 202 are configured to detect the position of the rotor 108 both axially and radially and send a signal to a controller (not shown) that is config-ured to adjust the electric current send by power amplifiers (not shown) through the stator bars in the AMBs 115,116, 216 accordingly. In another embodiment, the actuating radial and axial AMB coils are used to detect radial and axial rotor positions, respectively, referred to as self-sensing, removing the need for dedicated position sensors.

Although AMBs can be more expensive than conven-tional ball bearings, they offer several technological advan-tages e.g.: they do not need to be lubricated and allow for high-temperature use and high rotation speeds. Further, due to the lack of mechanical wear, AMBs have lower mainte-nance costs and higher lifetimes than conventional bearings.

The axial AMB 216 comprises a disc-shaped rotor 208 and stator 210 on both axial sides of the rotor 208, with each side comprising and circumferentially extending solid stator bars 212, in correspondingly circumferentially extending slots 211. The radial AMBs comprise a rotor 108, stator 110, and solid stator bars 112. The AMB rotor 108, 208, both for the radial and axial bearings is in an embodiment a solid block of machined iron or stacked silica iron laminates but it is understood that other, suitable materials may be used, such as cobalt and cobalt alloys which have good magnetic permeability, high magnetic saturation and higher Curie temperature than iron which allows for better high tempera-ture performance. The AMB rotor parts may have holes near the center to reduce weight (not shown).

In an embodiment, the AMBs are constructed without permanent magnets, i.e. only using electromagnets. Known permanent magnets lose their magnetism at the high oper-ating temperatures for which the present AMBs are designed. Furthermore, permanent magnets do not regain their magnetization if their Curie temperature has been exceeded and typically have much lower 'maximum work-ing temperatures' at which the permanent magnets start to lose their magnetization. Thus, by not using permanent magnets, the active magnetic bearings can be used at higher temperatures than with permanent magnetic bearings. In an embodiment, the active magnetic bearings are constructed to operate at temperatures above 400° C., preferably above 500° C. even more preferable above 600° C.

Retainer bearings 15, 16 are in this embodiment addi-tional ball bearings, which, during normal operation are not (or at least not substantially) in contact with the rotor 8 and are not taking any load. In case of a malfunction, overload, or shutdown of the AMB, they keep the spinning rotor 8 from coming in contact with the stator 10 until the rotor 8 comes to a rest or until the AMBs regain control of the rotor 8.

The rotor 108/stator 110 assembly of the AMB (as shown e.g. in FIG. 19 and FIG. 20) comprises a stator hollow cylindrical core 126 with slots 111 formed within the inner part of the stator core 126. The stator 110 comprises stator windings 112, formed by solid stator bars 112, preferably of solid copper bars 112. The solid stator bars 112 may be connected to each other via electrical connectors 109 or to electric terminals 121, and spaced from the slots by spacers 13, as illustrated in the embodiment of FIGS. 1 to 16.

The clearance 20 extends between the stator 110 and the rotor 108 of the radial magnetic bearings. The clearance 20 also extends between the stator 210 and the rotor 208 of the axial magnetic bearing, thus, allowing the working fluid to pass through the full axial length of the flow machine 1.

Hereto, the can 18 extends inside the stators 110 of both radial magnetic bearings. The can 18 also extends into the axial magnetic bearing and in both cases separates the stators 110,210 from the working fluid.

The rotor 108 of the radial magnetic bearings and the rotor 208 of the axial magnetic bearing are in an embodiment enveloped by thin-walled containment shell 117, 217 for protecting the rotors 108,208 from the working fluid, espe-cially when the working fluid is an aggressive fluid that could damage the rotors 108,109. The shells 117,217 rotate in unison with the rotors 108,208, respectively, and separates the material of the rotor 108,208 from the working fluid. The shell 117,217 is at least partially formed by a thin-walled pipe made of stainless steel or a high nickel steel alloy such as Hastelloy-N.

The active magnetic bearings support the radial and axial load, respectively using electromagnetic suspension. The AMB bearing system is made up of several independently operated actuating coils. The respective coils generate a magnetic field when current is supplied, which magnetizes the ferromagnetic stator and rotor material surrounding the coil resulting in an attraction force between the stator and rotor.

The respective stator bars are connected to power ampli-fiers that supply current to the stator bars. A controller and position sensors (gap sensors) with associated electronics in the control unit provide the feedback required to control the position of the rotor within the gap. The power amplifier supplies equal bias current to two pairs of electromagnets on opposite sides of a rotor. This constant tug-of-war is medi-ated by the controller, which offsets the bias current by equal and opposite perturbations of current as the rotor deviates from its center position.

In an embodiment, the power amplifiers are solid state devices that operate in a pulse width modulation configu-ration. The controller is in an embodiment a microprocessor or digital signal processor.

The same construction as explained above can be used for a fluidic motor driving an electric generator. In this embodi-ment, structures and features that are the same or similar to corresponding structures and features previously described or shown herein are denoted by the same reference numeral as previously used for simplicity.

The impeller 6 is driven by the pressurized flow of fluid which passes through the volute 3 in the opposite direction as to what is described above, i.e. the previously denoted inlet 3, in this case, acts as an outlet and the outlet 4 acts as an inlet for the working fluid. The working fluid enters the impeller 6 through the outlet 4 (inlet here) and is forced upwards through the lumen 22 of the hollow shaft. The working fluid enters the clearance 20 and is pushed down-wards to enter the inlet 3 (outlet here) through which the working fluid exits the rotodynamic flow machine 1.

In this embodiment, the electric motor is operated as an electric generator for generating electrical power for use in an external circuit.

In an embodiment shown in FIG. 5B, the stator slots 11 contain only a single solid stator bar 12. In this embodiment, the solid stator bar 12 is either electrically insulated by the above-described spacers 13 or by being embedded in refrac-tory cement or other suitable electrically insulating material that fills out the space between the stator bar 12 and the slot 11 concerned.

In an embodiment shown in FIG. 5A, solid bars 12 have a longitudinal lumen 12L for allowing a cooling medium to flow through the bars 12. This cooling medium is a dedicated cooling medium used to provide additional active/forced cooling to the solid stator bars 12. This embodiment is particularly useful for large electric motors or generators.

In an embodiment (not shown) wherein said solid bars 12 are formed by multiple longitudinally extending filaments or strips, preferably copper filaments or strips, bonded together, for example, said filaments or strips being bonded together by brazing with a low conductivity alloy or bonded by ceramic coating. This embodiment is particularly useful for large electric motors or generators.

In an embodiment (not shown), the flow machine 1 is submerged into the molten salt by placing the flow machine 1 in a dry well enabling the impeller to be in direct contact with the molten salt thus avoiding additional effort related to priming of the flow machine 1, while the electric contacts 21, etc. are separated from the molten salt in the dry well. The dry well can be purged with inert gas to prevent or reduce oxidation of metallic parts of the flow machine 1. In an embodiment, several flow machines 1 are arranged in series in one or more dry wells to achieve higher head pressure.

The flow machine 1 is also suitable for pumping molten salt in a pyroprocessing system (pyrochemical processing facility), e.g. for recycling used nuclear fuel.

The various aspects and implementations have been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality.

The reference signs used in the claims shall not be construed as limiting the scope. Unless otherwise indicated, the drawings are intended to be read (e.g., cross-hatching, arrangement of parts, proportion, degree, etc.) together with the specification, and are to be considered a portion of the entire written description of this disclosure. As used in the description, the terms "horizontal", "vertical", "left", "right", "up" and "down", as well as adjectival and adverbial derivatives thereof, simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

We claim:

1. A canned rotodynamic flow machine (1) configured for operating with a molten salt or a cover gas working fluid at temperatures above 500° C., said canned rotodynamic flow machine (1) comprising:

an impeller (6) arranged in a volute (3), said volute (3) having an inlet (4) for said working fluid and an outlet (5) for said working fluid, an induction or reluctance motor or generator comprising:

a stator (10), a rotor (8), a can (18) in the form of a containment shell which separates a working fluid area from a dry area containing the stator (10), with the rotor (8) arranged in the working fluid area, said rotor (8) being operably coupled to said impeller (6) by a shaft (7), said stator (10) comprising stator windings for inducing a magnetic field that penetrates the rotor (8), said stator windings being distributed in slots (11) arranged in said stator (10), wherein the part of the stator windings inside said slots (11) is formed by one or more electrically conductive solid stator bars (12), one or more active magnetic bearings supporting said shaft (7),

wherein said one or more active magnetic bearings comprise:

a bearing stator (110,210) and a bearing rotor (108, 208), said bearing stator (110, 210) comprising bearing stator windings for inducing a magnetic field that penetrates said bearing rotor (108, 208), said bearing stator windings being distributed in one or more slots (111, 211) arranged in said bearing stator (110,210), the part of the bearing stator windings inside said one or more slots (111, 211) being formed by one or more electrically conductive solid bearing bars (112, 212), said dry area containing the bearing stator (110, 210), with the bearing rotor (108, 208) arranged in the working fluid area.

2. A canned rotodynamic flow machine (1) according to claim 1, wherein said solid bearing bars (112, 212) are positioned and held inside said slots (111, 211) by one or more spacers (113, 213) for electrically insulating said one or more solid bearing bars (112, 212) from said stator (110, 210) by spacing.

3. A canned rotodynamic flow machine (1) according to claim 2, wherein said spacers (113,213) are configured to space said solid bearing bars (112, 212) from walls of said slot (111, 211) and/or from other solid bearing bars (112, 212) in the slot (111, 211) concerned.

4. A canned rotodynamic flow machine (1) according to claim 3, wherein said spacers (113, 213) support said solid bearing bars (112, 212) locally and wherein said spacers (113, 213) are provided at two or more axially spaced positions along the length of said solid bearing bars (112, 212) in the slot (111, 211) concerned.

5. A canned rotodynamic flow machine (1) according to claim 1, wherein said solid bearing bars (112, 212) have a cross-sectional area of at least 5 mm$^2$.

6. A canned rotodynamic flow machine (1) according to claim 2, wherein said solid bearing bars (112, 212) are sufficiently rigid to maintain their shape under influence of magnetic forces generated when said motor or generator is operating, without coming in contact with the walls of the slot (111, 211) in which they are received, and without coming in contact with other solid bearing bars (112, 212) in the slot (111, 211) in which they are received, with said solid bearing bars (112, 212) being supported in said slot (111, 211) by said spacers (113,213) only.

7. A canned rotodynamic flow machine (1) according to claim 2, wherein said solid bearing bars (112, 212) are positioned inside said slots (111, 211) by at least two spacers (113, 213) that space the surface of said solid bearing bars (112, 212) from the surface of said slots (111, 211) and create a void between the surface of solid bearing bars (112, 212) and the surface of said slots (111, 211) for electrically insulating said one or more electrically conductive solid bearing bars (112,212) from said stator (110,210).

8. An active magnetic bearing for use in a canned flow machine that operates with a working fluid, said active magnetic bearing being configured to operate in an environment having a temperature above 500° C., said active magnetic bearing comprising:

a stator (110,210) and a rotor (108,208), said stator (110,210) comprising stator windings for inducing a magnetic field that penetrates said rotor (108,208), means (201, 202) for detecting the position of said rotor (108,208) in communication with a controller configured for controlling a current supply to said stator windings, said stator windings being distributed in one or more slots (111, 211) arranged in said stator (110,210), the part of the stator windings inside said one or more slots (111, 211) being formed by one or more electrically conductive solid bearing bars (112, 212), characterized by said solid bearing bars (112, 212) being positioned inside said slots (111, 211) by one or more spacers (113, 213) for electrically insulating said one or more electrically conductive solid bearing bars (112, 212) from said stator (110,210), a can (18), separating a working fluid area, from a dry area containing the stator (110,210), with the rotor (108, 208) arranged in the working fluid area.

9. An active magnetic bearing according to claim 8, wherein said active magnetic bearing is a radial bearing and said slots (111, 211) and said solid bearing bars (112) extend in said stator (110) along a straight line, or wherein said active magnetic bearing is an axial bearing and said slots (211) are circumferentially extending slots and said solid bearing bars (212) extend inside the circumferentially extending slots in said stator (210).

10. An active magnetic bearing according to claim 8, wherein said spacers (113, 213) are configured to space said solid bearing bars (112, 212) from walls of said slot (111, 211) and/or from other solid bearing bars (112, 212) in the slot (111, 211) concerned.

11. An active magnetic bearing according to claim 8, wherein said spacers (113, 213) support said solid bearing bars (112, 212) locally and wherein said spacers (113, 213) are provided at two or more axially spaced positions along the length of said solid bearing bars (112, 212) in the slot (111, 211) concerned.

12. An active magnetic bearing according to claim 8, wherein said solid bearing bars (112, 212) have a cross-sectional area of at least 5 mm$^2$.

13. An active magnetic bearing according to claim 8, wherein said solid bearing bars (112, 212) are insulated only by being spaced from other elements of said active magnetic bearing by said spacers (113, 213).

14. An active magnetic bearing according to claim 8, for use in a canned flow machine, said active magnetic bearing comprising the can (18), separating a working fluid area, from a dry area containing the stator (110, 210), with the rotor (108, 208) arranged in the working fluid area, said rotor (108, 208) being contained in a containment shell (117, 217) for protecting the rotor (108, 208) from the working fluid.

15. An active magnetic bearing according to claim 14, wherein said active magnetic bearing has a clearance (20) between said rotor (108,208) and said stator (110,210), between said can (18) and said containment shell (117, 217) and said active magnetic bearing is configured to be cooled by a flow of working fluid through said clearance (20).

* * * * *